US012518706B2

(12) United States Patent
Li et al.

(10) Patent No.: US 12,518,706 B2
(45) Date of Patent: Jan. 6, 2026

(54) DISPLAY DEVICE INCLUDING A DISPLAY DRIVING COMPONENT HAVING A VOLTAGE STABILIZING CIRCUIT

(71) Applicant: Wuhan Tianma Micro-Electronics Co., Ltd., Wuhan (CN)

(72) Inventors: Zhuoxun Li, Wuhan (CN); Chenghui Huang, Wuhan (CN); Jun Li, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/759,140

(22) Filed: Jun. 28, 2024

(65) Prior Publication Data

US 2025/0299636 A1 Sep. 25, 2025

(30) Foreign Application Priority Data

Mar. 25, 2024 (CN) ........................ 202410346649.2

(51) Int. Cl.
*G09G 3/3266* (2016.01)

(52) U.S. Cl.
CPC ..... *G09G 3/3266* (2013.01); *G09G 2330/023* (2013.01)

(58) Field of Classification Search
None
See application file for complete search history.

(56) References Cited

U.S. PATENT DOCUMENTS

2005/0206641 A1* 9/2005 Morita ................. G09G 3/3696 345/211
2013/0003230 A1* 1/2013 Kojima .................. H05B 45/60 361/18

FOREIGN PATENT DOCUMENTS

CN 105894066 A * 8/2016
CN 111223453 A * 6/2020 ........... G09G 3/3225
JP 2001007286 A * 1/2001

* cited by examiner

*Primary Examiner* — Kirk W Hermann
(74) *Attorney, Agent, or Firm* — Anova Law Group, PLLC

(57) ABSTRACT

A display device includes a display panel and a power supply circuit. A display driving circuit is disposed in a non-display region of the display panel. The power supply circuit includes a display driving component and a power supply. The display driving component at least includes a first power supply circuit and a first voltage stabilizing circuit. The power supply is electrically connected to the first power supply circuit that is further electrically connected to the first voltage stabilizing circuit. The first voltage stabilizing circuit is electrically connected to the display driving component which is electrically connected with the display driving circuit. The display driving component includes a first preset bonding point electrically connected to the first voltage stabilizing circuit, and a second preset bonding point electrically connected to the power supply. The first voltage stabilizing circuit generates a first power supply greater than the power supply.

20 Claims, 19 Drawing Sheets

DISPLAY DEVICE INCLUDING A DISPLAY DRIVING COMPONENT HAVING A VOLTAGE STABILIZING CIRCUIT

CROSS-REFERENCE TO RELATED APPLICATION

This application claims the priority of Chinese Patent Application No. 202410346649.2, filed on Mar. 25, 2024, the content of which is incorporated herein by reference in its entirety.

TECHNICAL FIELD

The present disclosure generally relates to the field of display technology and, more particularly, relates to a display device.

BACKGROUND

With the development of science and technology, mobile electronic devices such as smartphones and computers are used more and more widely. Display panels are one of the main components of these electronic devices. The development of organic light-emitting diode (OLED) display panels and liquid crystal display (LCD) display panels is becoming more and more important. An OLED display screen is a display screen made of organic electrical self-luminous diodes. Since the OLED display screen has advantages of self-luminous organic electroluminescent diodes, no need for a backlight, high contrast, thin, a wide viewing angle, a fast response speed, ability to be used in flexible panels, a wide operating temperature range, and simple structures and processes, the OLED display screen is considered to be emerging application technology of the next generation of flat display.

With the development of electronic equipment, more and more components are integrated into the electronic equipment, and the functions they implement are becoming more and more powerful. At the same time, the power consumption of the electronic equipment is getting higher and higher. Power consumption of display screens of the electronic equipment is a main factor affecting the power consumption of the electronic equipment.

Therefore, how to reduce screen power consumption and increase the standby time of electronic display devices is an urgent technical problem that needs to be solved.

SUMMARY

One aspect of the present disclosure provides a display device. The display device includes a display panel and a power supply circuit electrically connected to the display panel. A display driving circuit is disposed in a non-display region of the display panel. The power supply circuit includes a display driving component and a power supply electrically connected to the display driving component. The display driving component at least includes a first power supply circuit and a first voltage stabilizing circuit. The power supply is electrically connected to an input terminal of the first power supply circuit. An output terminal of the first power supply circuit is electrically connected to an input terminal of the first voltage stabilizing circuit, an output terminal of the first voltage stabilizing circuit is electrically connected to an output terminal of the display driving component; and the output terminal of the display driving component is electrically connected with the display driving circuit. The display driving component includes a first preset bonding point and a second preset bonding point. The first preset bonding point is electrically connected to the input terminal of the first voltage stabilizing circuit, and the second preset bonding point is electrically connected to the power supply; and the output terminal of the first voltage stabilizing circuit generates a first power supply. A value of the first power supply is greater than a value of the power supply.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
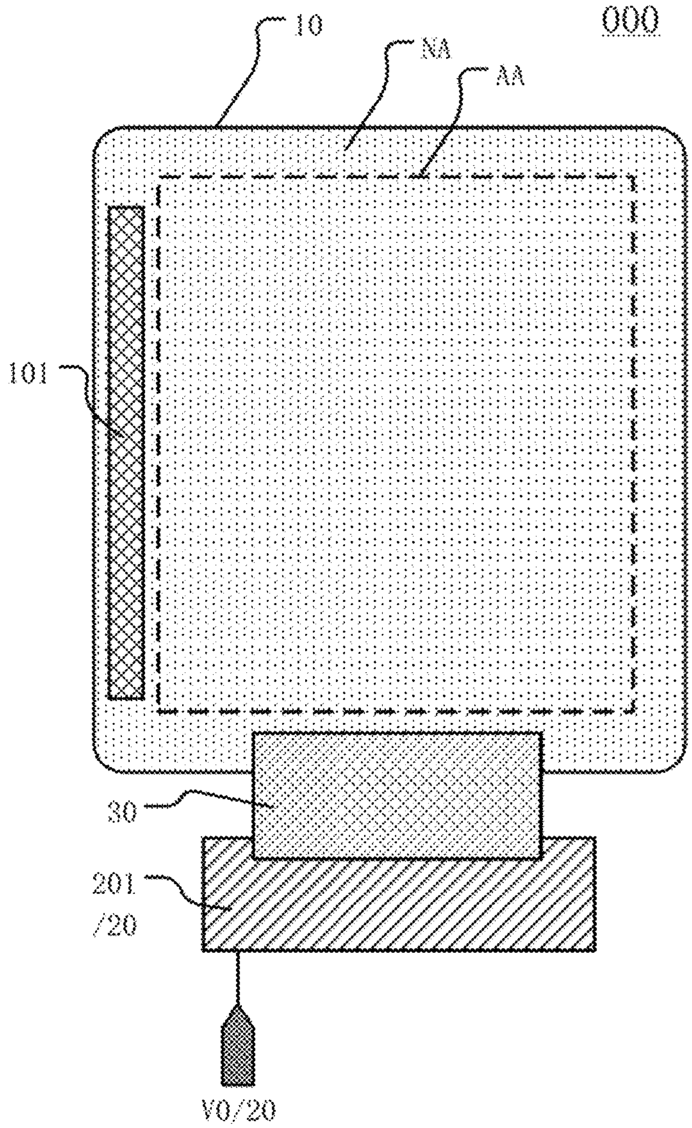
FIG. 1 illustrates a planar structure of an exemplary display device consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, relational terms such as first and second are only used to distinguish one entity or operation from another entity or operation, and do not necessarily require or imply any such actual relationship between these entities or operations or order. Moreover, the terms "including", "comprising" or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence "including . . . " do not exclude the existence of other same elements in the process, method, article, or equipment that includes the elements.

It should be understood that when describing the structure of a component, when a layer or region is referred to as being "on" or "above" another layer or another region, the layer or region may be directly on the other layer or region, or indirectly on the other layer or region, for example, layers/components between the layer or region and another layer or another region. And, for example, when the component is reversed, the layer or region may be "below" or "under" the other layer or region. In the present disclosure, the term "electrical connection" refers to that two components are directly electrically connected with each other, or the two components are electrically connected via one or more other components.

Figure 2:
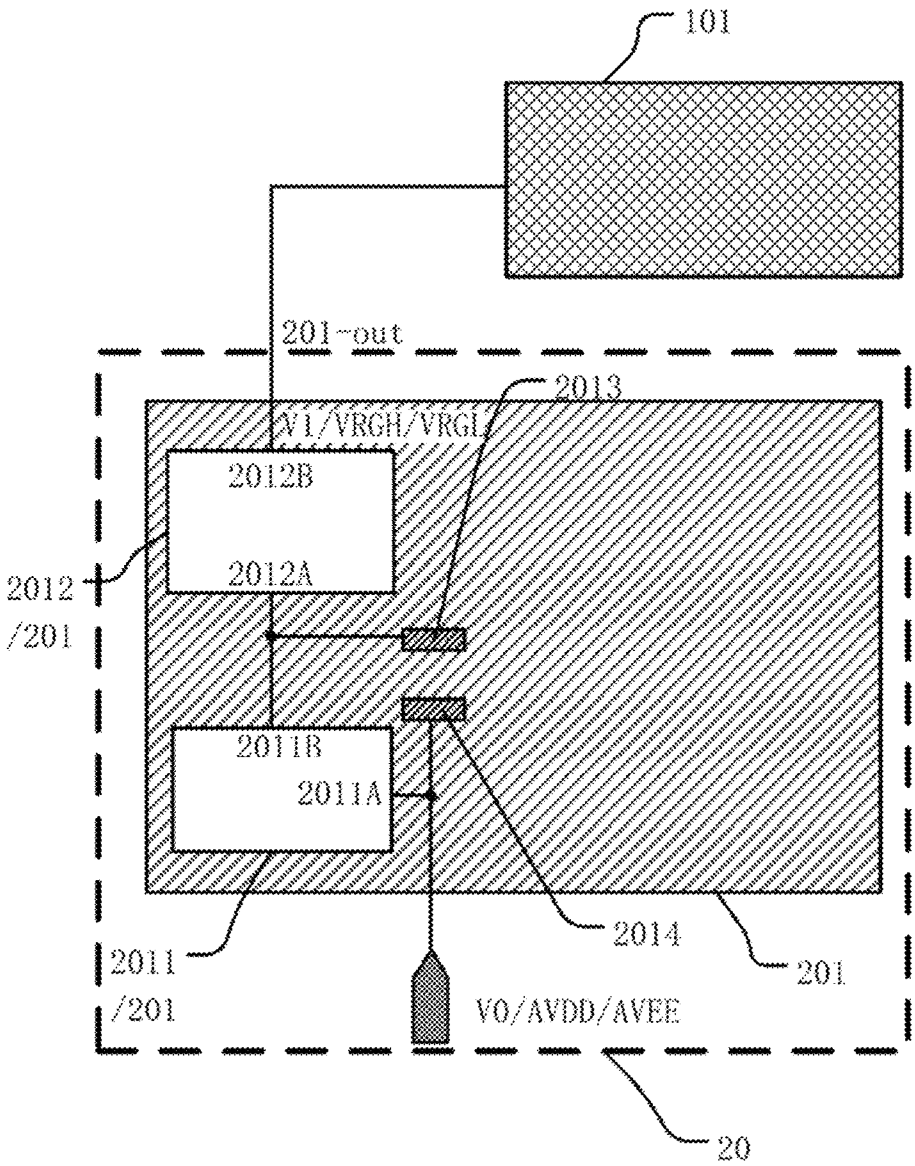
FIG. 2 illustrates an electrical connection structure of a power supply circuit and a display driving circuit in the display device shown in FIG. 1, consistent with various disclosed embodiments in the present disclosure.

The present disclosure provides a display device. In one embodiment shown in FIG. 1 which is a planar structure of the display device and FIG. 2 illustrating an electrical connection of a power supply circuit and a display driving circuit in the display device shown in FIG. 1, the display device 000 may include a display panel 10, and a power supply circuit 20 electrically connected to the display panel 10. A display driving circuit 101 may be disposed in a non-display region NA of the display panel 10.

The power supply circuit 20 may include a display driving component 201 and a power supply V0 electrically connected to each other.

The display driving component 201 may at least include a first power supply circuit 2011 and a first voltage stabilizing circuit 2012. The power supply V0 may be electrically connected to an input terminal 2011A of the first power supply circuit 2011, and an output terminal 2011B of the first power supply circuit 2011 may be electrically connected to an input terminal 2012A of the first voltage stabilizing circuit 2012. An output terminal 2012B of the first voltage stabilizing circuit 2012 may be electrically connected to an output terminal 201-*out* of the display driving component 201. The output terminal 201-*out* of the display driving component 201 may be electrically connected to the display driving circuit 101.

The display driving component 201 may include a first preset bonding point 2013 and a second preset bonding point 2014. The first preset bonding point 2013 may be electrically connected to the input terminal 2012A of the first voltage stabilizing circuit 2012, and the second preset bonding point 2014 may be electrically connected to the power supply V0.

The output terminal 2012B of the first voltage stabilizing circuit 2012 may generate the first power supply V1. The value of the first power supply V1 may be greater than the value of power supply V0.

In the present disclosure, the display device 000 may include the display panel 10 and the power supply circuit 20 that supplies power to the display panel 10. The power supply circuit 20 may be electrically connected to the display panel 10. In various embodiments, the display panel 10 may be an organic light-emitting diode display panel or other types of display panels, which is not limited in the present disclosure. The structure of the display panel 10 will not be described in detail, and the reference may be made to the structure of the display panel in existing technologies for understanding according to the type of the display panel 10. In one embodiment, the display panel 10 may include the display region AA and the non-display region NA. The display region AA may be generally provided with structures such as the pixel units (not shown in the figure) for displaying images. The non-display region NA may be generally provided with structures such as the display driving circuit 101 or the signal lines (not shown in the figure) electrically connected to the display driving circuit 101, to provide display driving signals for the pixel units in the display region AA.

In the present disclosure, the power supply circuit 20 may include the display driving component 201 and the power supply V0 electrically connected to each other. The power supply V0 may be used to provide an initial power value for the display driving component 201, such that the display driving component 201 of the power supply circuit 20 is able to perform power generation work according to the power supply V0. It can be understood that the display driving component 201 may be a display driver integration chip (DDIC). The display driving component 201 may at least include the first power supply circuit 2011 and the first voltage stabilizing circuit 2012. Optionally, in one embodiment, the first power supply circuit 2011 and the first voltage stabilizing circuit 2012 may be integrated into the display driving component 201. When the display driving component 201 is a display driver integration chip, the first power supply circuit 2011 and the first voltage stabilizing circuit 2012 may be circuit structures printed and integrated into the display driver integration chip. The present disclosure does not limit the specific structure of the display driving component 201, as long as the display driving component 201 includes the first power supply circuit 2011 and the first voltage stabilizing circuit 2012. It can be understood that the figures in the present disclosure all use block diagrams to represent the display driving component 201, and the first power supply circuit 2011 and the first voltage stabilizing circuit 2012 included therein. Optionally, in one embodiment, the display driving component 201 may be electrically connected to the display panel 10 through the flexible circuit board structure 30. The display driving component 201 may be electrically connected to the display panel 10, and may be integrated with the display panel 10 into one device. For example, the display driving component 201 may be fixed on the backlight surface of the display panel 10 (not shown in the figure, the backlight surface of the display panel 10 may be understood as a side of the display panel opposite to a surface of the display panel 10 where the display region AA is located).

In one embodiment, the power supply V0 may be electrically connected to the input terminal 2011A of the first power supply circuit 2011, the output terminal 2011B of the first power supply circuit 2011 may be electrically connected to the input terminal 2012A of the first voltage stabilizing circuit 2012, and the output terminal 2012B of the first voltage stabilizing circuit 2012 may be electrically connected to the output terminal 201-*out* of the display driving component 201. Optionally, the display driving component 201 may be also used to generate the first power supply V1 at the output terminal 2012B of the first voltage stabilizing circuit 2012 (that is, the output terminal 201-*out* of the display driving component 201) through the first power supply circuit 2011 and the first voltage stabilizing circuit 2012, based on the initial power value provided by the power supply V0. The output terminal 201-*out* of the display driving component 201 may be electrically connected to the display driving circuit 101. The power supply V1 may be transmitted to the display driving circuit 101 in the non-display region NA of the display panel 10 as a power supply for the display driving circuit 101, such that the display driving circuit 101 operates normally.

The drawings where the display driving circuit 101 is represented by blocks are used to illustrate the present disclosure, and the blocks do not represent actual structures and positions of the display driving circuit 101. In various embodiments, references may be made to structures of the display driving circuit in existing technologies. Also, the position of the display driving circuit 101 in FIG. 1 is used as an example only to illustrate the present disclosure. In other embodiments, the display driving circuit 101 may be disposed at other positions in the non-display region NA of the display panel 10.

In one embodiment, the display driving component 201 may include the first preset bonding point 2013 and the second preset bonding point 2014. In one embodiment, the display driving component 201 may be a display driver chip, and the first preset bonding point 2013 and the second preset bonding point 2014 may be understood as reserved soldering points (reserved pins) on the display driver chip. The first preset bonding point 2013 may be electrically connected to the input terminal 2012A of the first voltage stabilizing circuit 2012, and the second preset bonding point 2014 may be electrically connected to the power supply V0. In this embodiment, the first preset bonding point 2013 electrically connected to the input terminal 2012A of the first voltage stabilizing circuit 2012 and the second preset bonding point 2014 electrically connected to the power supply V0 may be reserved in advance when the display driving component 201 is produced, to achieve at least two working modes of the power supply circuit 20 in the display device 000.

For example, in one embodiment, the power supply circuit 20 may include a first working mode and a second working mode.

Figure 3:
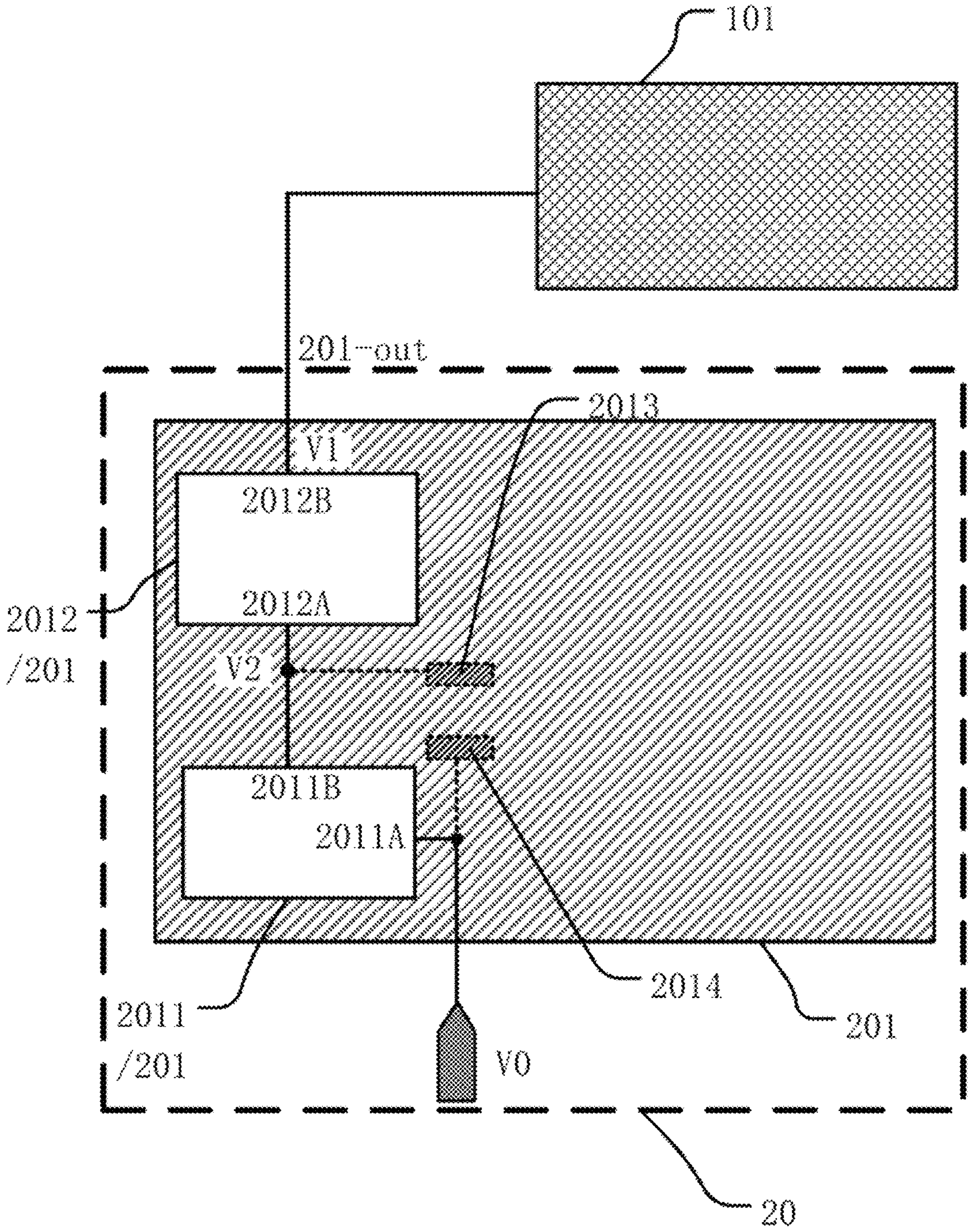
FIG. 3 illustrates an electrical connection structure of the power supply circuit and the display driving circuit in a first working mode shown in FIG. 2, consistent with various disclosed embodiments in the present disclosure.

As shown in FIG. 1, FIG. 2, and FIG. 3 which is a schematic diagram of the electrical connection between the power supply circuit and the display driving circuit in the first working mode in FIG. 2, when the power supply circuit 20 is in the first working mode, no components may be welded on the first preset bonding point 2013 and the second preset bonding point 2014, that is, the first preset bonding point 2013 and the second preset bonding point 2014 may be open and not electrically connected (indicated by a dotted line). The driving power supply voltage required by the display driving circuit 101 in the non-display region NA of the display panel 10, that is, the first power supply V1, may be generated in a following process sequentially. The power supply V0 of the power supply circuit 20 may be input to the first power supply circuit 2011 (such as a charge bump circuit) through the input terminal 2011A of the first power circuit 2011 sequentially, and the power supply V0 may be converted by the first power supply circuit 2011 into a higher power supply voltage value such as the second power supply V2. The second power supply V2 may be output from the output terminal 2011B of the first power supply circuit 2011 to the input terminal 2012A of the first voltage stabilizing circuit 2012, and the relatively stable first power supply V1 may be generated through the first voltage stabilizing circuit 2012. The value of the first power supply V1 may be greater than the value of the power supply V0, which may meet the design requirements for driving the display of the display panel 10. After the first power supply V1 is finally output from the output terminal 2012B of the first voltage stabilizing circuit 2012, that is, the output terminal 201-*out* of the display driving component 201, the first power supply V1 may become the driving power supply voltage required by the display driving circuit 101 in the non-display region NA of the display panel 10. In this first working mode, because of a high driving power supply voltage required by the display driving circuit 101 in the non-display region NA of the display panel 10, that is, the first power supply V1, the power supply V0 of the power supply circuit 20 may pass through the first power supply circuit in sequence 2011 (such as the charge bump circuit) to be converted into a higher power supply voltage value, and then the first voltage stabilizing circuit 2012 may generate the relatively stable first power supply V1. Therefore, in this working mode, the capability requirement on the external power supply device that provides the power supply V0 may be low, that is, the display driving component 201 may be used to generate a demand value that meets the display requirements of the display panel 10, which is beneficial to saving costs.

Figure 4:
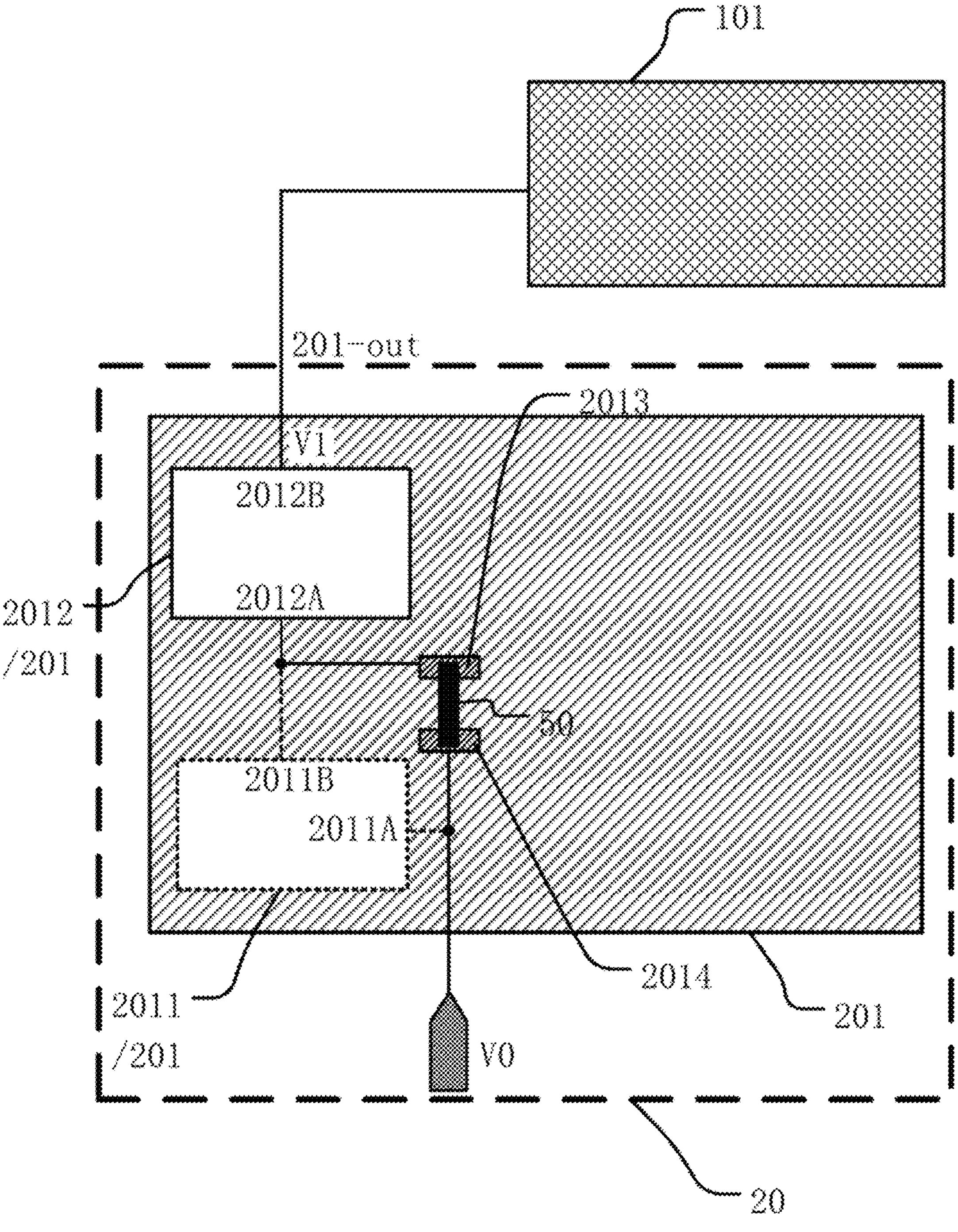
FIG. 4 illustrates an electrical connection structure of the power supply circuit and the display driving circuit in a second working mode shown in FIG. 2, consistent with various disclosed embodiments in the present disclosure.

As shown in FIG. 1, FIG. 2, and FIG. 4 which is a schematic diagram of the electrical connection principle between the power supply circuit and the display driving circuit in the second working mode in FIG. 2, in the second working mode of the power supply circuit 20, the first preset bonding point 2013 and the second preset bonding point 2014 may be electrically connected. For example, some electronic components may be soldered between the first preset bonding point 2013 and the second preset bonding point 2014, such that the first preset bonding point 2013 is electrically connected to the second preset bonding point 2014. Since the first preset bonding point 2013 is electrically connected to the input terminal 2012A of the first voltage stabilizing circuit 2012 and the second preset bonding point 2014 is electrically connected to the power supply V0, the power supply V0 may be directly electrically connected to the input terminal 2012A of the first voltage stabilizing circuit 2012 in the second working mode, and the first power supply circuit 2011 may not work (indicated by a dotted line) in the second working mode, which is beneficial to reducing the power consumption (power loss) of the display driving component 201. At this time, the driving power supply voltage required by the display driving circuit 101 in the non-display region NA of the display panel 10, that is, the first power supply V1, may be generated by the following process. The power supply V0 of the power supply circuit 20 may be directly transmitted to the input terminal 2012A of the first voltage stabilizing circuit 2012. The first voltage stabilizing circuit 2012 may directly generate the relatively stable first power supply V1. The value of the first power supply V1 may be greater than the value of the power supply V0, which may meet the design requirements for driving the display panel 10. The first power supply V1 may be output from the output terminal 2012B of the first voltage stabilizing circuit 2012, that is, the output terminal 201-*out* of the display driving component 201, and become the driving power supply voltage required by the display driving circuit 101 in the non-display region NA of the display panel 10.

In the second working mode, for the high driving power supply voltage required by the display driving circuit 101 in the non-display region NA of the display panel 10, that is, the first power supply V1, the power supply V0 of the power supply circuit 20 may be converted to the stable first power supply V1 directly through the first voltage stabilizing circuit 2012. Therefore, in the second working mode, the capability requirement on the external power supply device that provides the power supply V0 may be high. For the power supply equipment with improved capabilities, after the voltage value of the generated power supply V0 is increased and the stability is enhanced, the power supply circuit 20 may select the second working mode.

In the present embodiment, during the production of the display driving component 201, the first preset bonding point 2013 electrically connected to the input terminal 2012A of the first voltage stabilizing circuit 2012 and the second preset bonding point 2014 electrically connected to the power supply V0 may be reserved in advance. The working mode of the power supply circuit 20 may be flexibly selected based on the ability of the external power supply device. When the first preset bonding point 2013 and the second preset bonding point 2014 are disconnected, for the high driving power supply voltage required by the display driving circuit 101 in the non-display region NA of the display panel 10, that is, the first power supply V1, the power supply V0 of the power supply circuit 20 may pass through the first power circuit in sequence. 2011 to be converted into a higher power supply voltage value, and then the first voltage stabilizing circuit 2012 may generate the relatively stable first power supply V1. Therefore, in this working mode, the capability requirement on the external power supply device that provides the power supply V0 may be low, that is, the display driving component 201 may be used to generate a demand value that meets the display requirements of the display panel 10, which is beneficial to saving costs. When the first preset bonding point 2013 and the second preset bonding point 2014 are electrically connected, the first power circuit 2011 may not work. for the high first power supply V1 required by the display driving circuit 101 in the non-display region NA of the display panel 10, the power supply V0 of the power supply circuit 20 may be converted to the stable first power supply V1 directly through the first voltage stabilizing circuit 2012, which may be used as the driving power supply voltage required by the required by the display driving circuit 101 in the non-display region NA of the display panel 10 meeting the design requirements of the display panel 10. And since the first power circuit 2011 in the display driving component 201 does not need to work in the second working mode, the power consumption of the display driving component 201 may be greatly reduced.

In one embodiment as shown in FIG. 1 to FIG. 3, in the first working mode of the power supply circuit 20, the value of the second power supply V2 may be greater than the value of the power supply V0, and may be greater than the value of the first power supply V1.

In the present embodiment, when the power supply circuit 20 of the display device 000 selects the first working mode, the first preset bonding point 2013 and the second preset bonding point 2014 may be disconnected and not electrically connected, and the high driving power supply voltage required by the display driving circuit 101 in the non-display region NA of the display panel 10, that is, the first power supply V1, may be generated by following processes sequentially. The power supply V0 of the power supply circuit 20 may be input to the first power supply circuit 2011 (such as a charge bump circuit) through the input terminal 2011A of the first power circuit 2011 sequentially, and the power supply V0 may be converted by the first power supply circuit 2011 into a higher power supply voltage value such as the second power supply V2. The value of the second power supply V2 may be greater than the value of the power supply V0. The first power supply circuit 2011 may convert the relatively low power supply V0 to the higher second power supply V2, and the capability requirement on the external power supply device that provides the power supply V0 may be low. The second power supply V2 may be output from the output terminal 2011B of the first power supply circuit 2011 to the input terminal 2012A of the first voltage stabilizing circuit 2012, and the relatively stable first power supply V1 may be generated through the first voltage stabilizing circuit 2012. The value of the first power supply V1 may be greater than the value of the power supply V0, and the value of the second power supply V2 may be greater than the value of the first power supply V1. That is, the value of the first power supply V1 after the first voltage stabilizing circuit 2012 may be slightly lower than the value of the second power supply V2, and may meet the requirements of the high and stabilizing voltage for driving the display panel 10 to display. After the stabilized first power supply V1 is finally output from the output terminal 2012B of the first voltage stabilizing circuit 2012, that is, the output terminal 201-*out* of the display driving component 201, the first power supply V1 may become the driving power supply voltage required by the display driving circuit 101 in the non-display region NA of the display panel 10, to ensure the normal display function of the display panel 10.

In one embodiment, the display device may select the 4 Power mode as the power supply voltage of the display driving component 201 (DDIC). In the 4 Power mode, the power supply voltage of the display driving component 201 generated by the external power supply equipment includes four independent voltages "AVDD, VCI, VDDI, DVDD". In another embodiment, the display device may also adopt the 3 Power mode, that is, the power supply voltage of the display driving component 201 generated by the external power supply device includes three independent voltages "AVDD, VCI, and VDDI". DVDD may be generated by VDDI through circuit conversion inside the display driving component 201. AVDD, VCI, VDDI, and DVDD may provide voltage sources for different circuit modules integrated within the display driving component 201. For example, VCI may be the voltage source for some special function modules of the display driving component 201. These will not be described in detail here, and the reference may be made to the working principle of DDIC in related technologies for understanding.

In one embodiment, the power supply V0 may be the positive power supply AVDD. For example, when the display device selects the 3 Power mode as the power supply voltage of the display driving component 201 (DDIC) and the power supply V0 is the positive power supply AVDD provided by an external power supply device, by actually measuring and comparing the power consumption of the display driving component between the existing design solution and the present disclosure where the power supply circuit 20 adopts the second working mode, the reference data in Table 1 below may be obtained.

TABLE 1

| Solution | DDIC supply voltage (V) VDDI | VCI | AVDD (V0) | Current (mA) VDDI | VCI | DVDD | AVDD (V0) | DDIC power (mW) |
|---|---|---|---|---|---|---|---|---|
| Existing technology | 1.8 | 3 | 7.6 | 12.4 | 0 | 53.5 | 23 | 261.3 |
| | 1.8 | 3 | 7.6 | 7.8 | 4.6 | 53.5 | 23 | 266.8 |
| | 1.8 | 3 | 7.6 | 7.8 | 0 | 55 | 27.7 | 290.6 |
| | 1.8 | 3 | 7.6 | 7.9 | 4.5 | 53.5 | 23 | 266.7 |
| | 1.8 | 3 | 7.6 | 3.3 | 9.1 | 53.5 | 23 | 272.2 |
| | 1.8 | 3 | 7.6 | 3.3 | 4.5 | 55 | 27.7 | 296 |
| | 1.8 | 3 | 7.6 | 7.9 | 0 | 53.5 | 27.7 | 288.9 |
| | 1.8 | 3 | 7.6 | 3.3 | 4.6 | 53.5 | 27.7 | 294.5 |
| | 1.8 | 3 | 7.6 | 3.3 | 0 | 55 | 32.2 | 316.7 |
| Present disclosure | 1.8 | 3 | 7.6 | 3.3 | 0 | 53.5 | 23 | 244.9 |

From Table 1, it can be seen that the maximum power of the display driving component (DDIC) in the existing technology is 316.7 mW and the minimum power is 261.3 mW. In the present disclosure where the power supply circuit 20 adopts the second working mode, the power consumption of the display driving circuit 201 (DDCI) may be only 244.9 mW. Compared with the existing technology, the present disclosure may save up to 71.8 mW of power consumption, a decrease of 22.7%, and the lowest power consumption may be saved at 16.4 mW, a decrease of 6.3%. Compared with the existing technology, the average reduction ratio by the present disclosure may reach 13.38%. That is, the present disclosure may reduce the power loss by about 13.38% on average compared with the existing technology, ensuring that the power consumption of the display driving component 201 may be greatly reduced.

In one embodiment, as shown in FIG. 1 and FIG. 2, the power supply V0 of the power supply circuit 20 may include a positive power supply AVDD and/or a negative power supply A VEE.

The power supply V0 of the power supply circuit 20 may include the positive power supply AVDD, or the power supply V0 of the power supply circuit 20 may include the negative power supply A VEE, or the power supply V0 of the power supply circuit 20 may include the positive power supply AVDD and the negative power supply AVEE. When the display driving circuit 101 drives the pixel units in the display region AA of the display panel 10, for example, when the display driving circuit 101 performs driving work and provides driving signals such as scanning driving signals or light emission control signals to the pixel units in the display region AA, the positive power supply voltage VRGH and the negative power supply voltage VRGL may generally need to be provided to the display driving circuit 101 to achieve normal operation of the display driving circuit 101. As shown in FIG. 1 and FIG. 2, when the power supply V0 includes the positive power supply AVDD, the positive power supply voltage VRGH may be provided to the display driving circuit 101 through the first power supply circuit 2011 and the first voltage stabilizing circuit 2012 included in the display driving component 201. That is, the first power supply V1 generated by the output terminal 2012B of the first voltage stabilizing circuit 2012 may be the positive power supply voltage VRGH. As shown in FIG. 1 and FIG. 2, when the power supply V0 includes the negative power supply A VEE, the negative power supply voltage VRGL may be provided to the display driving circuit 101 through the first power supply circuit 2011 and the first voltage stabilizing circuit 2012 included in the display driving component 201. That is, the first power supply V1 generated by the output terminal 2012B of the first voltage stabilizing circuit 2012 may be the negative power supply voltage VRGL. It can be understood that, generally, the positive power supply voltage VRGH is a positive value, and the negative power supply voltage VRGL is a negative value.

Figure 5:
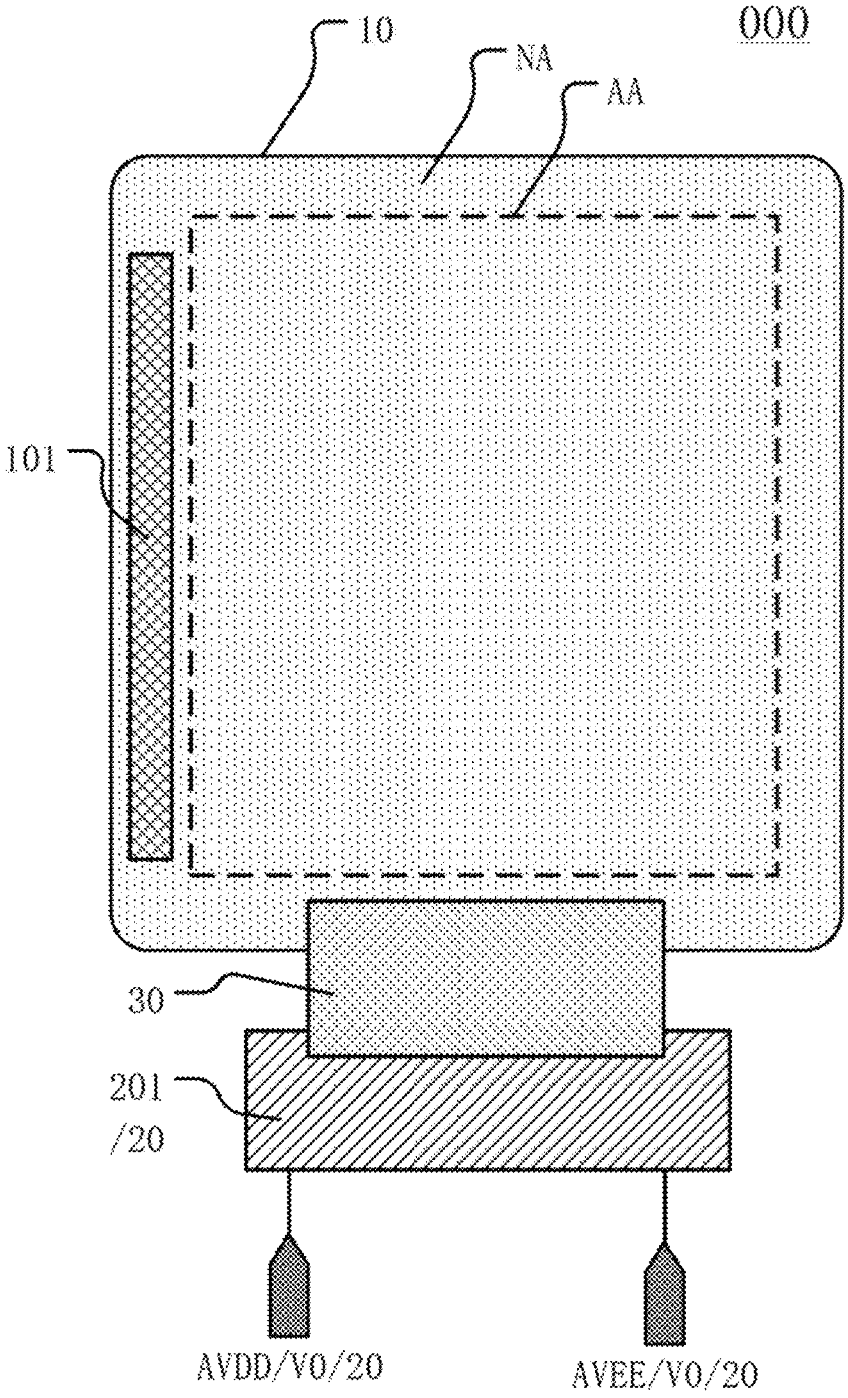
FIG. 5 illustrates a planar structure of another exemplary display device consistent with various disclosed embodiments in the present disclosure.
Figure 6:
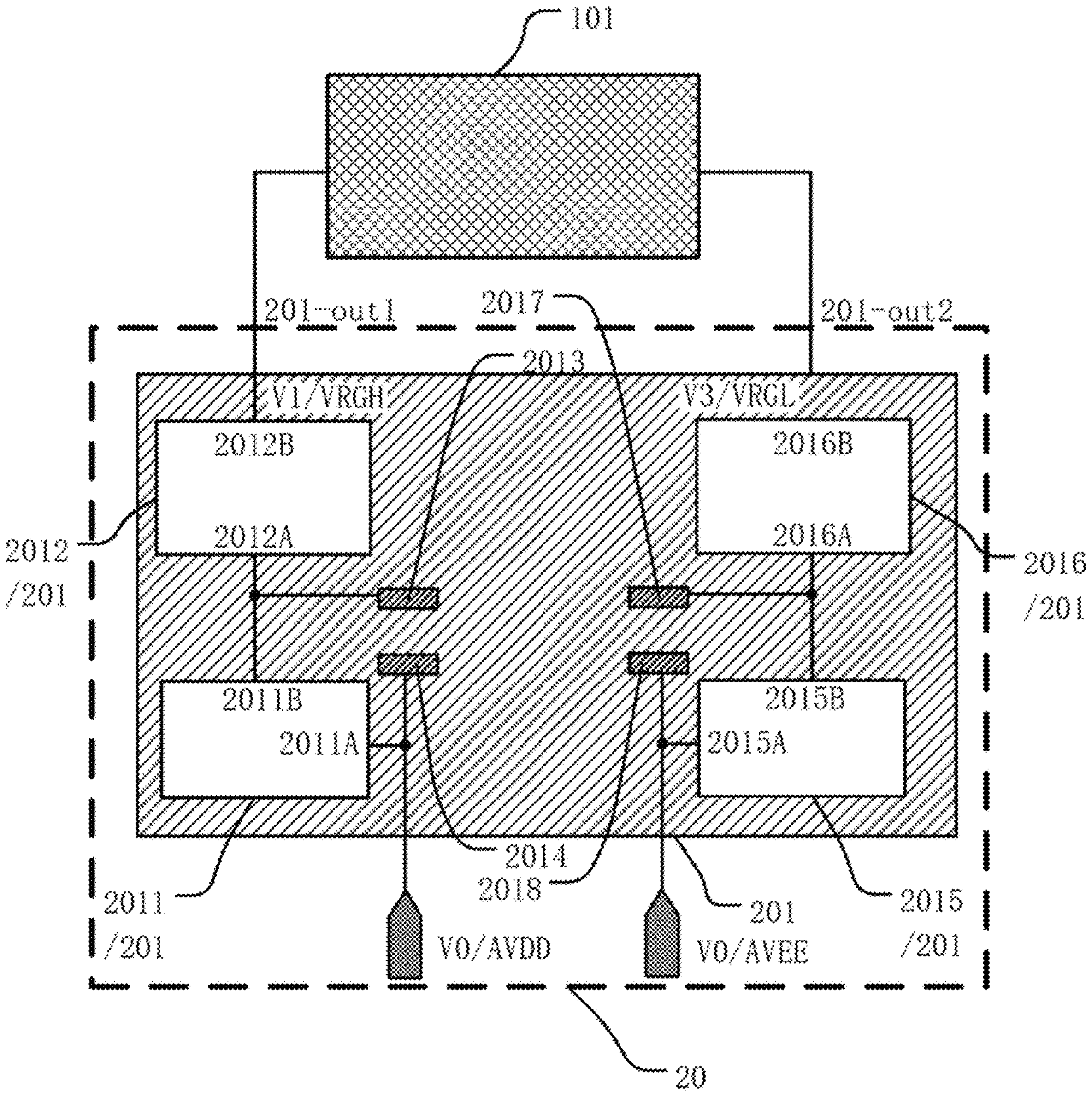
FIG. 6 illustrates an electrical connection structure of a power supply circuit and a display driving circuit in the display device shown in FIG. 5, consistent with various disclosed embodiments in the present disclosure.

In some other embodiments shown in FIG. 5 which is a planar structure of the display device and FIG. 6 which is an electrical connection structure of the power supply circuit and the display driving circuit in FIG. 5, the power supply circuit 20 may include a display driving component 201 and a power supply V0 electrically connected to each other.

The power supply V0 may include a positive power supply AVDD and a negative power supply AVEE. The display driving component 201 may at least include a first power supply circuit 2011, a first voltage stabilizing circuit 2012, a second power supply circuit 2015 and a second voltage stabilizing circuit 2016.

The positive power supply AVDD may be electrically connected to the input terminal 2011A of the first power supply circuit 2011, and the output terminal 2011B of the first power supply circuit 2011 may be electrically connected to the input terminal 2012A of the first voltage stabilizing circuit 2012. The output terminal 2012B of the first voltage stabilizing circuit 2012 may be electrically connected to the first output terminal 201-*out*1 of the display driving component 201, and the first output terminal 201-*out*1 of the display driving component 201 may be electrically connected to the display driving circuit 101.

The display driving component 201 may include a first preset bonding point 2013 and a second preset bonding point 2014. The first preset bonding point 2013 may be electrically connected to the input terminal 2012A of the first voltage stabilizing circuit 2012. The second preset bonding point 2014 may be electrically connected to the positive power supply AVDD. The output terminal 2012B of the first voltage stabilizing circuit 2012 may generate the first power supply V1. The value of the first power supply V1 may be greater than the value of the positive power supply AVDD.

The negative power supply AVEE may be electrically connected to the input terminal 2015A of the second power supply circuit 2015, and the output terminal 2015B of the second power supply circuit 2015 may be electrically connected to the input terminal 2016A of the second voltage stabilizing circuit 2016. The output terminal 2016B of the second voltage stabilizing circuit 2016 may be electrically connected to the second output terminal 201-*out*2 of the display driving component 201, and the second output terminal 201-*out*2 of the display driving component 201 may be electrically connected to the display driving circuit 101.

The display driving component 201 may include a third preset bonding point 2017 and a fourth preset bonding point 2018. The third preset bonding point 2017 may be electrically connected to the input terminal 2016A of the second voltage stabilizing circuit 2016. The fourth preset bonding point 2018 may be electrically connected to the negative power supply A VEE. The output terminal 2015B of the second voltage circuit 2016 may generate a third power supply V3, and the value of the third power supply V3 may be greater than the value of the negative power supply AVEE.

The power supply V0 of the power supply circuit 20 may include the positive power supply AVDD and the negative power supply AVEE. When the display driving circuit 101 drives the pixel units in the display region AA of the display panel 10, for example, when the display driving circuit 101 performs driving work and provides driving signals such as scanning driving signals or light emission control signals to the pixel units in the display region AA, the positive power supply voltage VRGH and the negative power supply voltage VRGL may generally need to be provided to the display driving circuit 101 to achieve normal operation of the display driving circuit 101. The display driving component 201 may include the first power supply circuit 2011 and the first voltage stabilizing circuit 2012 for generating the positive power supply voltage VRGH based on the positive power supply AVDD, and the second power supply circuit 2015 and the second voltage stabilizing circuit 2016 for generating the negative power supply voltage VRGL based on the negative power supply AVEE.

The power supply circuit 20 may have a first working mode and a second working mode.

Figure 7:
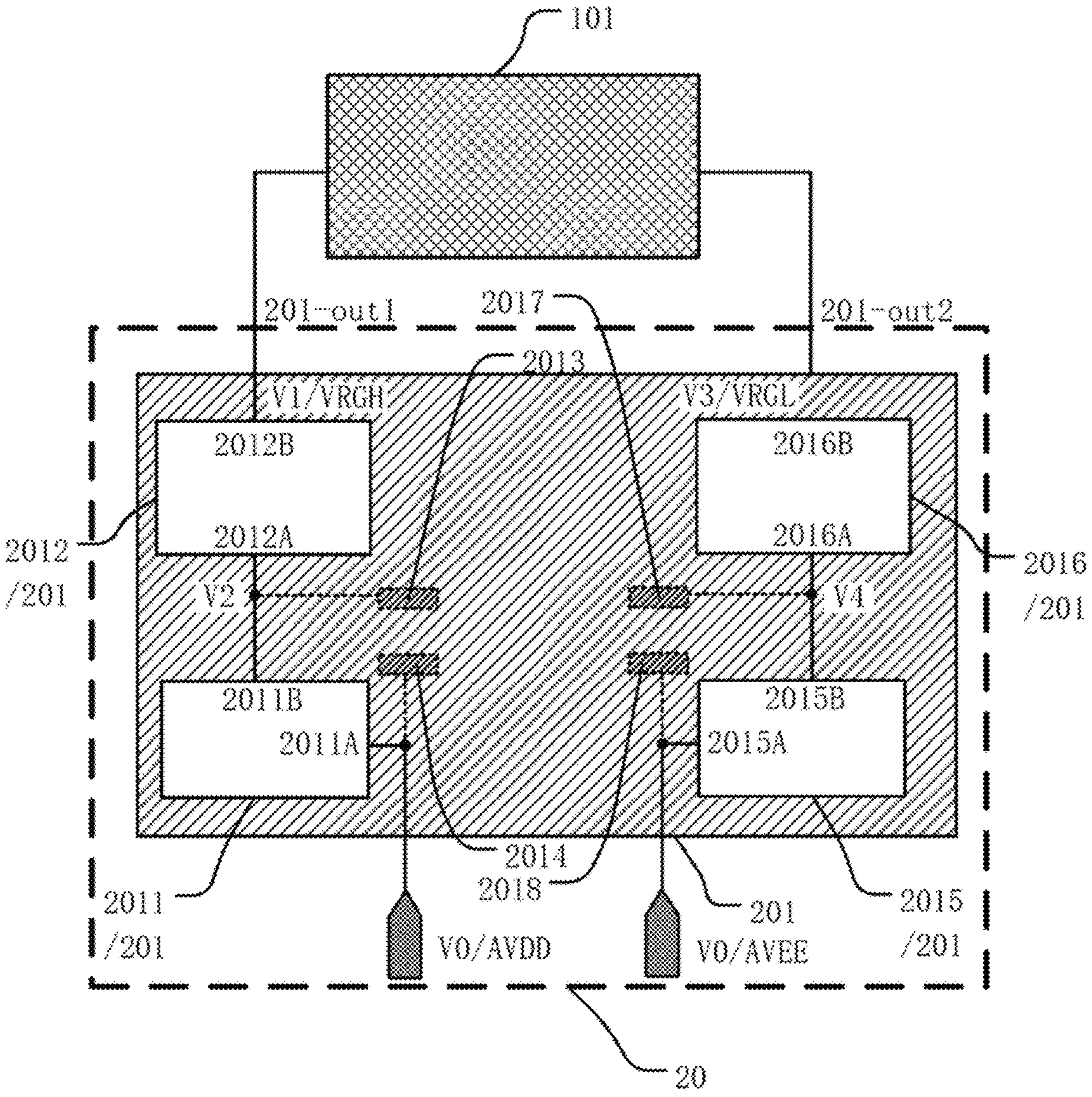
FIG. 7 illustrates an electrical connection structure of the power supply circuit and the display driving circuit in a first working mode shown in FIG. 6, consistent with various disclosed embodiments in the present disclosure.

As shown in FIG. 5, FIG. 6, and FIG. 7 which is an electrical connection of the power supply circuit in the first working mode and the display driving circuit in FIG. 6, in the first working mode of the power supply circuit 20, no components may be welded on the first preset bonding point 2013 and the second preset bonding point 2014, and no components may be welded on the third preset bonding point 2017 and the fourth preset bonding point 2018. That is, the first preset bonding point 2013 and the second preset bonding point 2014 may be open and not electrically connected (indicated by a dotted line), and the third preset bonding point 2017 and the fourth preset bonding point 2018 may be open and not electrically connected (indicated by a dotted line). The positive power supply voltage VRGH required by the display driving circuit 101 in the non-display region NA of the display panel 10, that is, the first power supply V1, may be generated in a following process sequentially. The positive power supply AVDD of the power supply circuit 20 may be input to the first power supply circuit 2011 (such as a charge bump circuit) through the input terminal 2011A of the first power circuit 2011 sequentially, to be converted by the first power supply circuit 2011 into a higher power supply voltage value such as the second power supply V2. The second power supply V2 may be output from the output terminal 2011B of the first power supply circuit 2011 to the input terminal 2012A of the first voltage stabilizing circuit 2012, and the relatively stable first power supply V1 may be generated through the first voltage stabilizing circuit 2012. The value of the first power supply V1 may be greater than the value of the positive power supply AVDD, which may meet the design requirements for driving the display of the display panel 10. After the first power supply V1 is finally output from the output terminal 2012B of the first voltage stabilizing circuit 2012, that is, the first output terminal 201-*out*1 of the display driving component 201, the first power supply V1 may become the positive power supply voltage VRGH required by the display driving circuit 101 in the non-display region NA of the display panel 10. The negative power supply voltage VRGL required by the display driving circuit 101 in the non-display region NA of the display panel 10, that is, the third power supply V3, may be generated in a following process sequentially. The negative power supply AVEE of the power supply circuit 20 may be input to the second power supply circuit 2015 (such as a charge bump circuit) through the input terminal 2015A of the second power circuit 2015 sequentially, to be converted by the second power supply circuit 2015 into a higher power supply voltage value such as the fourth power supply V4. The fourth power supply V4 may be output from the output terminal 2015B of the second power supply circuit 2015 to the input terminal 2016A of the second voltage stabilizing circuit 2016, and the relatively stable third power supply V3 may be generated through the second voltage stabilizing circuit 2016. The value of the third power supply V3 may be greater than the value of the negative power supply AVEE, which may meet the design requirements for driving the display of the display panel 10. After the third power supply V3 is finally output from the output terminal 2016B of the second voltage stabilizing circuit 2016, that is, the second output terminal 201-*out*2 of the display driving component 201, the third power supply V3 may become the negative power supply voltage VRGL required by the display driving circuit 101 in the non-display region NA of the display panel 10. In this first working mode, because of the high driving power supply voltage required by the display driving circuit 101 in the non-display region NA of the display panel 10, that is, the first power supply V1, the positive power supply AVDD of the power supply circuit 20 may pass through the first power supply circuit 2011 to be converted into a higher power supply voltage value, and then the first voltage stabilizing circuit 2012 may generate the relatively stable first power supply V1. For the relatively low negative power supply voltage AVGL, that is, the third power supply V3, the negative power supply AVEE of the power supply circuit 20 may pass through the second power supply circuit in sequence 2015 to be converted into the higher fourth power supply V4, and then the second voltage stabilizing circuit 2016 may generate the relatively stable third power supply V3. Therefore, in this working mode, the capability requirement on the external power supply device that provides the power supply V0 may be low, that is, the display driving component 201 may be used to generate a demand value that meets the display requirements of the display panel 10, which is beneficial to saving costs.

Figure 8:
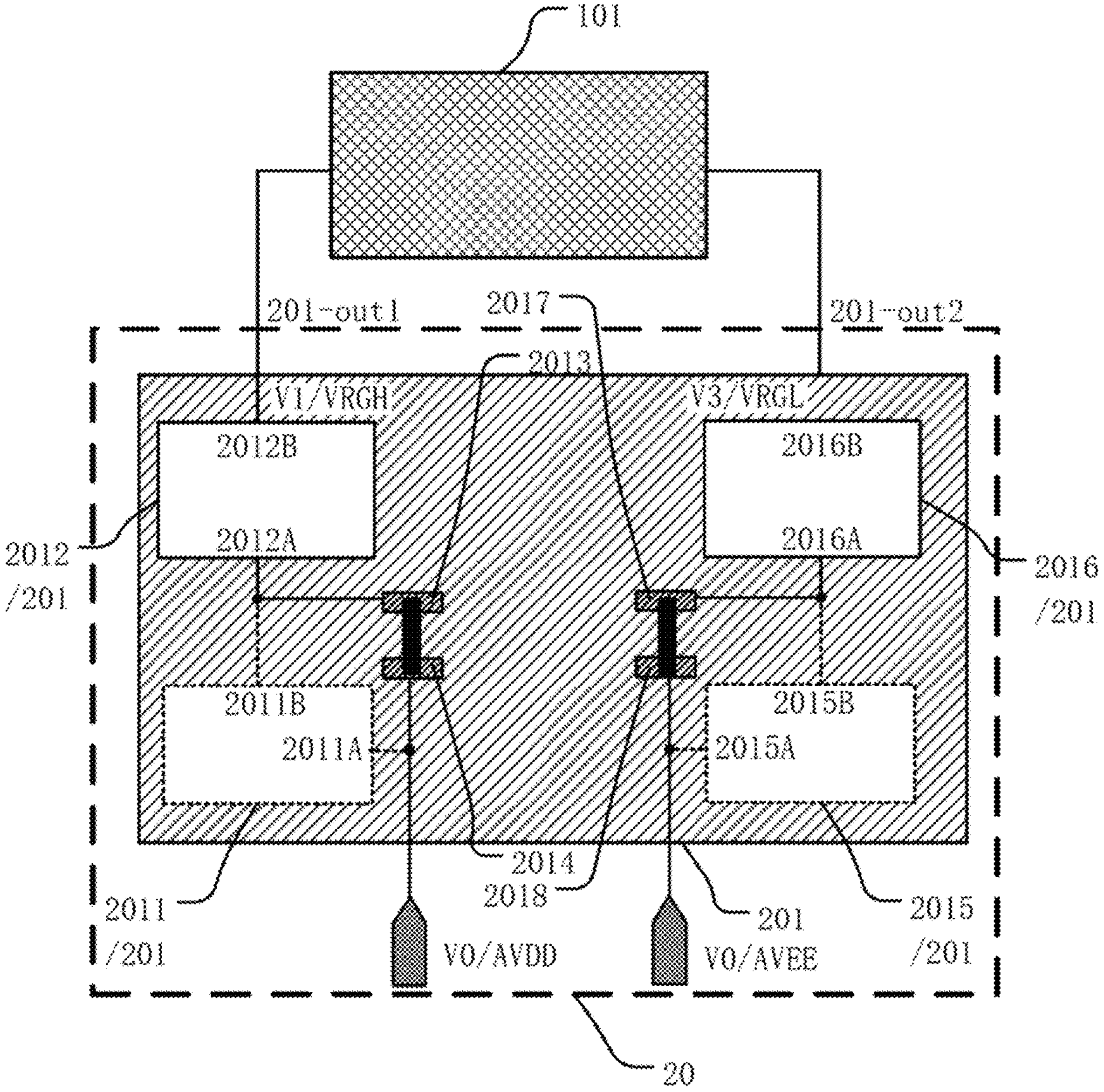
FIG. 8 illustrates an electrical connection structure of the power supply circuit and the display driving circuit in a second working mode shown in FIG. 6, consistent with various disclosed embodiments in the present disclosure.

As shown in FIG. 5, FIG. 6, and FIG. 8 which is an electrical connection of the power supply circuit in the second working mode and the display driving circuit in FIG. 6, in the second working mode of the power supply circuit 20, the first preset bonding point 2013 and the second preset bonding point 2014 may be electrically connected, and the third preset bonding point 2017 and the fourth preset bonding point 2018 may be electrically connected. For example, the first preset bonding point 2013 and the second preset bonding point 2014 may weld some electronic components such that the first preset bonding point 2013 is electrically connected to the second preset bonding point 2014, and the third preset bonding point 2017 and the fourth preset bonding point 2018 may weld some electronic components such that the third preset bonding point 2017 is electrically connected to the fourth preset bonding point 2018. Since the first preset bonding point 2013 is electrically connected to the input terminal 2012A of the first voltage stabilizing circuit 2012 and the second preset bonding point 2014 is electrically connected to the power supply V0, the power supply V0 may be directly electrically connected to the input terminal 2012A of the first voltage stabilizing circuit 2012 in the second working mode, and the first power supply circuit 2011 may not work (indicated by a dotted line) in the second working mode, which is beneficial to reducing the power consumption (power loss) of the display driving component 201. Since the third preset bonding point 2017 is electrically connected to the input terminal 2016A of the second voltage stabilizing circuit 2016 and the fourth preset bonding point 2018 is electrically connected to the negative power supply AVEE, the negative power supply AVEE may be directly electrically connected to the input terminal 2016A of the second voltage stabilizing circuit 2016 in the second working mode, and the second power supply circuit 2015 may not work (indicated by a dotted line) in the second working mode, which is beneficial to reducing the power consumption (power loss) of the display driving component 201. At this time, the positive power supply voltage VRGH required by the display driving circuit 101 in the non-display region NA of the display panel 10, that is, the first power supply V1, may be generated by a following process. The positive power supply AVDD of the power supply circuit 20 may be directly transmitted to the input terminal 2012A of the first voltage stabilizing circuit 2012. The first voltage stabilizing circuit 2012 may directly generate the relatively stable first power supply V1. The value of the first power supply V1 may be greater than the value of the positive power supply AVDD, which may meet the design requirements for driving the display panel 10. The negative power supply voltage VRGL required by the display driving circuit 101 in the non-display region NA of the display panel 10, that is, the third power supply V3, may be generated by following process. The negative power supply A VEE of the power supply circuit 20 may be directly transmitted to the input terminal 2016A of the second voltage stabilizing circuit 2016. The second voltage stabilizing circuit 2016 may directly generate the relatively stable third power supply V3. The value of the third power supply V3 may be greater than the value of the negative power supply AVEE, which may meet the design requirements for driving the display panel 10. The first power supply V1 may be output from the output terminal 2012B of the first voltage stabilizing circuit 2012, that is, the first output terminal 201-*out*1 of the display driving component 201, and become the positive power supply voltage VRGH required by the display driving circuit 101 in the non-display region NA of the display panel 10. The third power supply V3 may be output from the output terminal 2016B of the second voltage stabilizing circuit 2016, that is, the second output terminal 201-*out*2 of the display driving component 201, and become the negative power supply voltage VRGL required by the display driving circuit 101 in the non-display region NA of the display panel 10.

In the present embodiment, during the production of the display driving component 201, the first preset bonding point 2013 electrically connected to the input terminal 2012A of the first voltage stabilizing circuit 2012, the second preset bonding point 2014 electrically connected to the positive power supply AVDD, the third preset bonding point 2017 electrically connected to the input terminal 2016A of the second voltage stabilizing circuit 2016, and the fourth preset bonding point 2018 electrically connected to the negative power supply AVEE, may be reserved in advance. The working mode of the power supply circuit 20 may be flexibly selected based on the ability of the external power supply device. In the first working mode, the capability requirement on the external power supply device that provides the power supply V0 may be low, that is, the display driving component 201 may be used to generate a demand value that meets the display requirements of the display panel 10, which is beneficial to saving costs. In the second working mode, since the first power circuit 2011 in the display driving component 201 does not need to work in the second working mode, the power consumption of the display driving component 201 may be greatly reduced.

Figure 9:
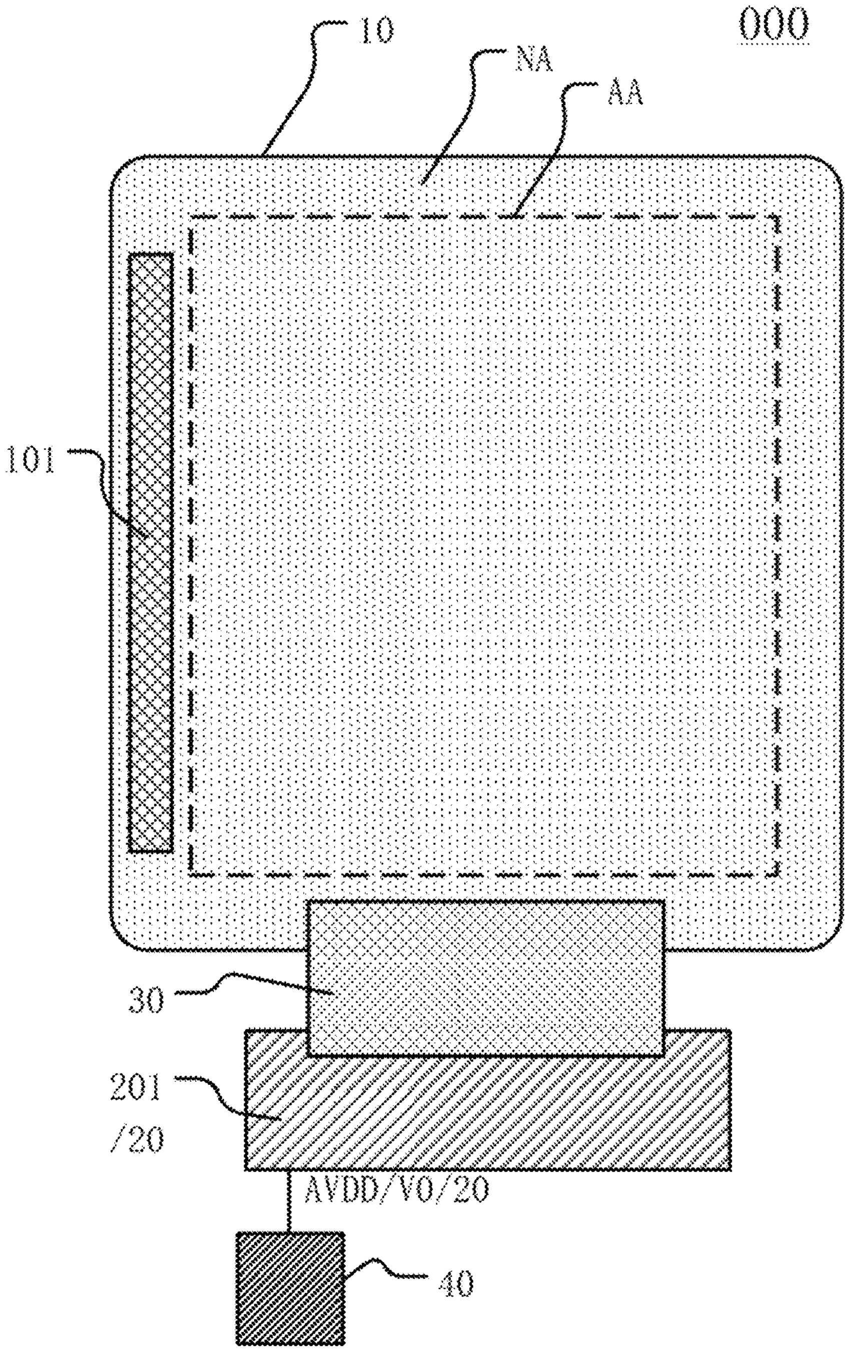
FIG. 9 illustrates a planar structure of another exemplary display device consistent with various disclosed embodiments in the present disclosure.
Figure 10:
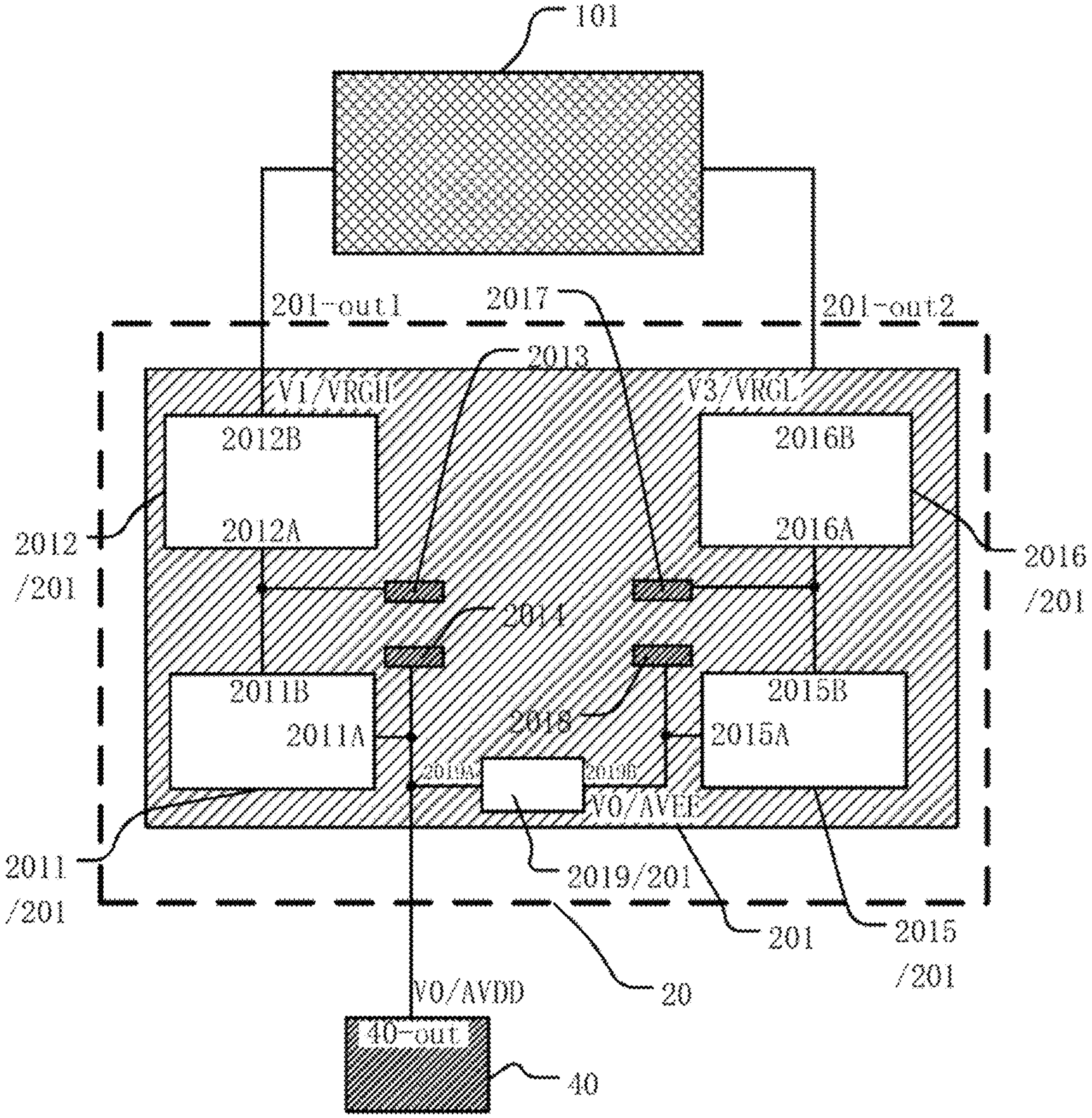
FIG. 10 illustrates an electrical connection structure of a power supply circuit and a display driving circuit in the display device shown in FIG. 9, consistent with various disclosed embodiments in the present disclosure.

In another embodiment shown in FIG. 9 which is another planar structure of the display device and FIG. 10 which is an electrical connection of the power supply circuit and the display driving circuit in FIG. 9, the power supply V0 may include a positive power supply AVDD, and the positive power supply AVDD may be electrically connected to the output terminal 40-*out* of an external power supply device 40.

In the present embodiment, the power supply V0 may include the positive power supply AVDD, and the positive power supply AVDD may be provided by the external power supply device 40. That is, the positive power supply AVDD may be electrically connected to the output terminal 40-*out* of the external power supply device 40, and may be provided by the external power supply device 40. The external power supply device 40 may be a power integrated circuit (Power IC). The working mode of the power supply circuit 20 may be flexibly selected according to the capability of the external power supply device 40. When the first working mode is selected, the requirement on the capability of the external power supply device 40 that provides the power supply V0 may be lower, that is, the display driving component 201 may be used to generate the demand value that meets the display requirements of the display panel 10, which is beneficial to cost saving. When the second working mode is selected, the first power circuit 2011 in the display driving component 201 may not work, such that the power consumption of the display driving component 201 may be greatly reduced.

In one embodiment, as shown in FIG. 9 and FIG. 10, the display driving component 201 may further include a conversion circuit 2019. The output terminal 40-*out* of the external power supply device 40 may be electrically connected to the input terminal 2019A of the conversion circuit 2019. The output terminal 2019B of the conversion circuit 2019 may generate the negative power supply AVEE.

In the present embodiment, the display driving component 201 may further include the conversion circuit 2019. The conversion circuit 2019 may be integrated into the display driving component 201. The output terminal 40-*out* of the external power supply device 40 for providing the positive power supply AVDD may be electrically connected to the input terminal 2019A of the conversion circuit 2019. The output terminal 2019B of the conversion circuit 2019 may generate the negative power supply AVEE. The conversion circuit 2019 may be used to convert the positive power supply AVDD provided by the external power supply device 40 into the negative power supply AVEE. Then, the negative power supply AVEE may be converted to the negative power supply voltage VRGL required by the display driving circuit 101 through the second power supply circuit 2015 and second voltage stabilizing circuit 2016 in the display driving component 201. In the present embodiment, the display driving component 201 may further include the conversion circuit 2019. Therefore, the external power supply device 40 may only need to provide the positive power supply AVDD, and the negative power supply A VEE may be generated by converting the positive power supply AVDD through the conversion circuit 2019. The requirement on the external power supply device 40 may be reduced, to reduce the power consumption of the external power supply device 40.

In one embodiment as shown in FIG. 1 to FIG. 4, when the power supply circuit 20 is in the second working mode, a first component 50 may be connected between the first preset bonding point 2013 and the second preset bonding point 2014.

Optionally, the first component 50 may be an electronic component with a small resistance value and an electrical connection effect. For example, the first component 50 may include a zero-ohm resistor. The zero-ohm resistor may be understood as a resistor with a very small resistance value, close to 0Ω. In other embodiments, the first component 50 may also be other electronic components, which is not limited in the present disclosure.

In the present embodiment, the first preset bonding point 2013 electrically connected to the input terminal 2012A of the first voltage stabilizing circuit 2012 and the second preset bonding point 2014 electrically connected to the power supply V0 may be reserved during the production of the display driving component 201. At least two working modes of the power supply circuit 20 in the display device 000 may be realized. In the second working mode of the power supply circuit 20, the first component 50 may be connected between the first preset bonding point 2013 and the second preset bonding point 2014, that is, a zero-ohm resistor or other electrical components with a very small resistance and electrical connection functions may be respectively welded to the first preset bonding point 2013 and the second preset bonding point 2014, to realize the electrical connection between the first preset bonding point 2013 and the second preset bonding point 2014. For the driving power supply voltage required by the display driving circuit 101 in the non-display region NA of the display panel 10, that is, the first power supply V1, the power supply V0 of the power supply circuit 20 may be directly transmitted to the input terminal 2012A of the first voltage stabilizing circuit 2012, such that the first voltage stabilizing circuit 2012 directly generates the relatively stable first power supply V1, which meets the design requirements for driving the display of the display panel 10. The first power supply circuit 2011 may not work at this time, which is beneficial to reducing the power consumption of the display driving component 201. In this embodiment, by controlling whether the first component 50 is connected between the first preset bonding point 2013 and the second preset bonding point 2014, the working mode of the power supply circuit 20 may be flexibly selected. Mode switching may be simple and convenient. Further, the first component 50 may be a component with the resistance as small as possible to reduce losses during voltage transmission.

In one embodiment, the display driving component 201 may include a driver program. In the second working mode, the driver program may control the first power supply circuit 2011 not to work.

In the present embodiment, when the power supply circuit 20 is in the second working mode, the first component 50 may be connected between the first preset bonding point 2013 and the second preset bonding point 2014. By controlling whether the first component 50 is connected between the first preset bonding point 2013 and the second preset bonding point 2014, the working mode of the power supply circuit 20 may be flexibly selected. Further, the display driving component 201 may include the driver program (which is not shown in the drawings, and may be understood as a program written into the display driving component 201). The driver program written by the display driving component 201 itself may automatically control whether the first power circuit 2011 is working. When the power supply circuit 20 selects the first working mode, the driver program written by the display driving component 201 itself may control the first power circuit. 2011 to work. When the power supply circuit 20 selects the second working mode, the driver program written by the display driving component 201 itself may control the first power supply circuit 2011 not to work, thereby saving the power consumption of the display driving component 201.

Figure 11:
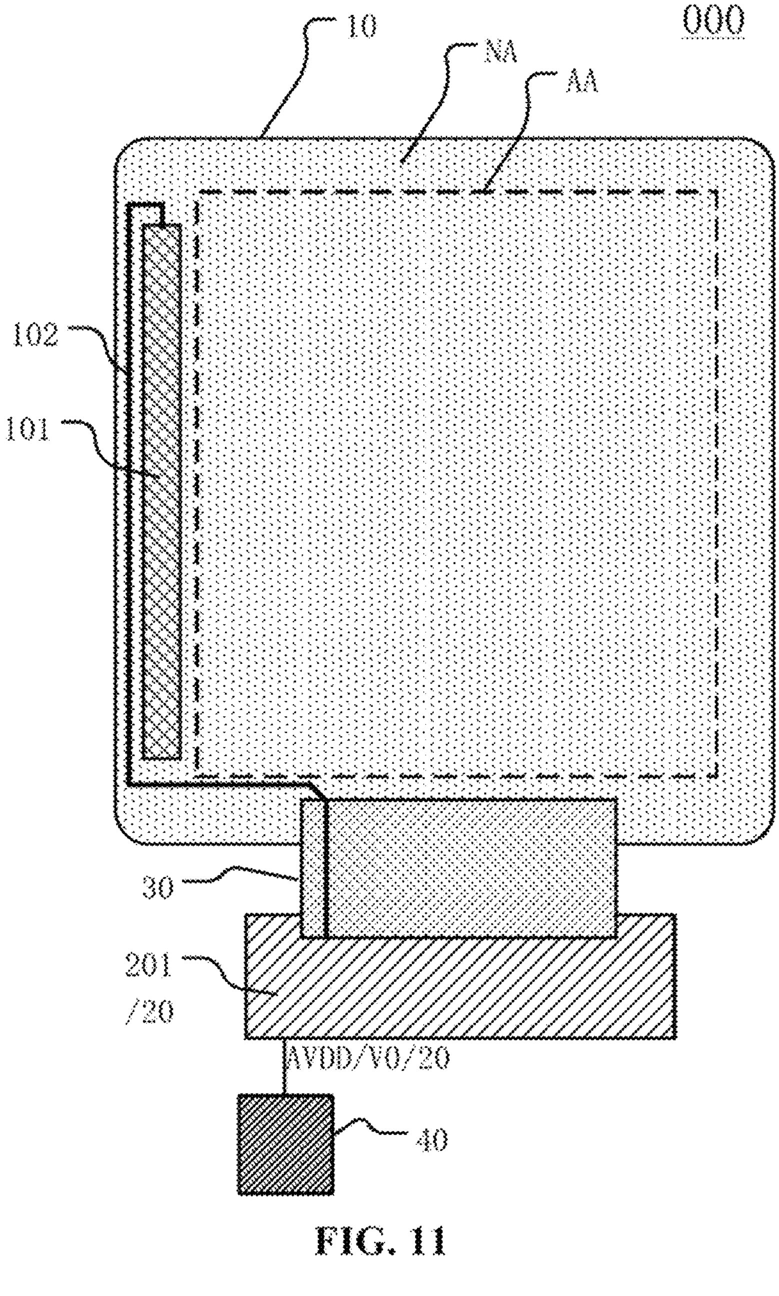
FIG. 11 illustrates a planar structure of another exemplary display device consistent with various disclosed embodiments in the present disclosure.

In one embodiment as shown in FIG. 2 and FIG. 11 which is another planar structure of the display device, a first power bus 102 may be disposed in the non-display region NA of the display panel 10. The output terminal 201-*out* of the display driving component 201 may be electrically connected to the display driving circuit 101 through the first power bus 102.

In the present embodiment, when the display driving circuit 101 drives the pixel units in the display region AA of the display panel 10, for example, by providing driving signals such as scanning driving signals or light-emitting control signals to the pixel units in the display region AA, at least a positive power supply voltage may be required (other driving power voltage may also be required) to be provided to the display driving circuit 101 to achieve normal operation of the display driving circuit 101. The display driving component 201 may include the first power supply circuit 2011 and the first voltage stabilizing circuit 2012 for generating the first power supply V1 based on the power supply V0. The first power supply V1 may be required to be ultimately transmitted to the display driving circuit 101 of the non-display region NA in the display panel 10. Therefore, in this embodiment, the first power bus 102 may be disposed in the non-display region NA of the display panel 10. The first power bus 102 may be arranged around the frame of the display panel 10. The output terminal 201-*out* of the display driving component 201 may be electrically connected to the display driving circuit 101 through the first power bus 102. When the display driving component 201 is electrically connected to the display panel 10 through the flexible circuit board structure 30, the first power supply V1 on the output terminal 201-*out* of the display driving component 201 may be transmitted to the first power bus 102 through the flexible circuit board structure 30, and the may be further transmitted to the display driving circuit 101 through the first power bus 102, to provide the driving power supply voltage for the display driving circuit 101 to operate and realize the electrical connection between the display driving circuit 101 and the first power supply V1.

Figure 12:
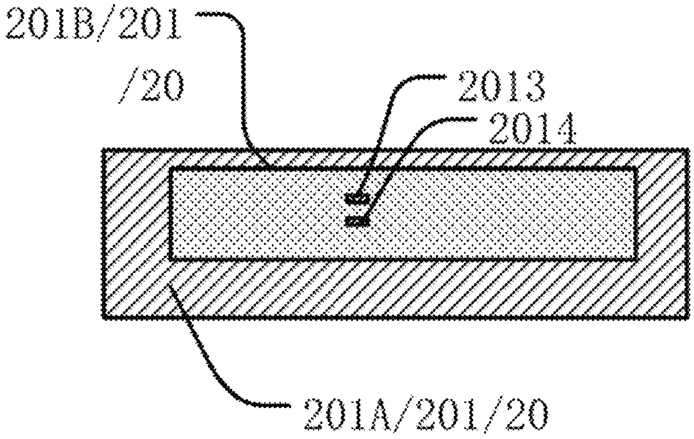
FIG. 12 illustrates a structure of a display driving component in the display device shown in FIG. 1 and FIG. 2, consistent with various disclosed embodiments in the present disclosure.

In one embodiment shown in FIG. 1, FIG. 2, and FIG. 12 which is a partial structure of the display driving component in FIG. 1 and FIG. 2, the display driving component 201 may include a driving circuit board 201A and a flexible circuit board 201B. The driving circuit board 201A may be bonded and electrically connected to the flexible circuit board 201B.

The first preset bonding point 2013 and the second preset bonding point 2014 may be disposed on the flexible circuit board. On 201B.

In the present embodiment, the display driving component 201 may include the driving circuit board 201A and the flexible circuit board 201B. The driving circuit board 201A may be a display driver chip (DDIC). When the display driving component 201 is electrically connected to the display panel 10, the drive circuit board 201A may be generally attached to the back of the display panel 10. To control the drive circuit board 201A, the flexible circuit board 201B may be bonded to the drive circuit board 201A. The flexible circuit board 201B may be a multi-layer flexible circuit board. (MFPC). Through the various circuit module structures printed on the flexible circuit board 201B, the power supply required for the drive circuit board 201A and the input and output of various signals may be realized. Further, some important signals of the drive circuit board 201A may be led out to the flexible circuit board 201B for monitoring. Optionally, the driving circuit board 201A may be bonded and electrically connected to the flexible circuit board 201B, and the flexible circuit board 201B may be pressed and bonded onto the driving circuit board 201A through ACF4 to achieve the electrical connection effect between the driving circuit board 201A and the flexible circuit board 201B.

In the present embodiment, the first preset bonding point 2013 and the second preset bonding point 2014 may be located on the flexible circuit board 201B. When the display driving component 201 is produced, the first preset bonding point 2013 and the second preset bonding point 2014 may be set on the flexible circuit board 201B before the driving circuit board 201A is bonded to the flexible circuit board 201B. That is, the first preset point 2013 electrically connected to the input terminal 2012A of the first voltage stabilizing circuit 2012 and the second preset bonding point 2014 electrically connected to the power supply V0 may be preserved on the flexible circuit board 201B. Then, the drive circuit board 201A may be bonded to the flexible circuit board 201B, thereby saving the layout space on the drive circuit board 201A. Further, when the power supply circuit 20 selects the second working mode, it may be convenient to print the first component or other electronic components on the flexible circuit board 201B to achieve a direct electrical connection effect between the power supply V0 and the input terminal 2012A of the first voltage stabilizing circuit 2012.

Figure 13:
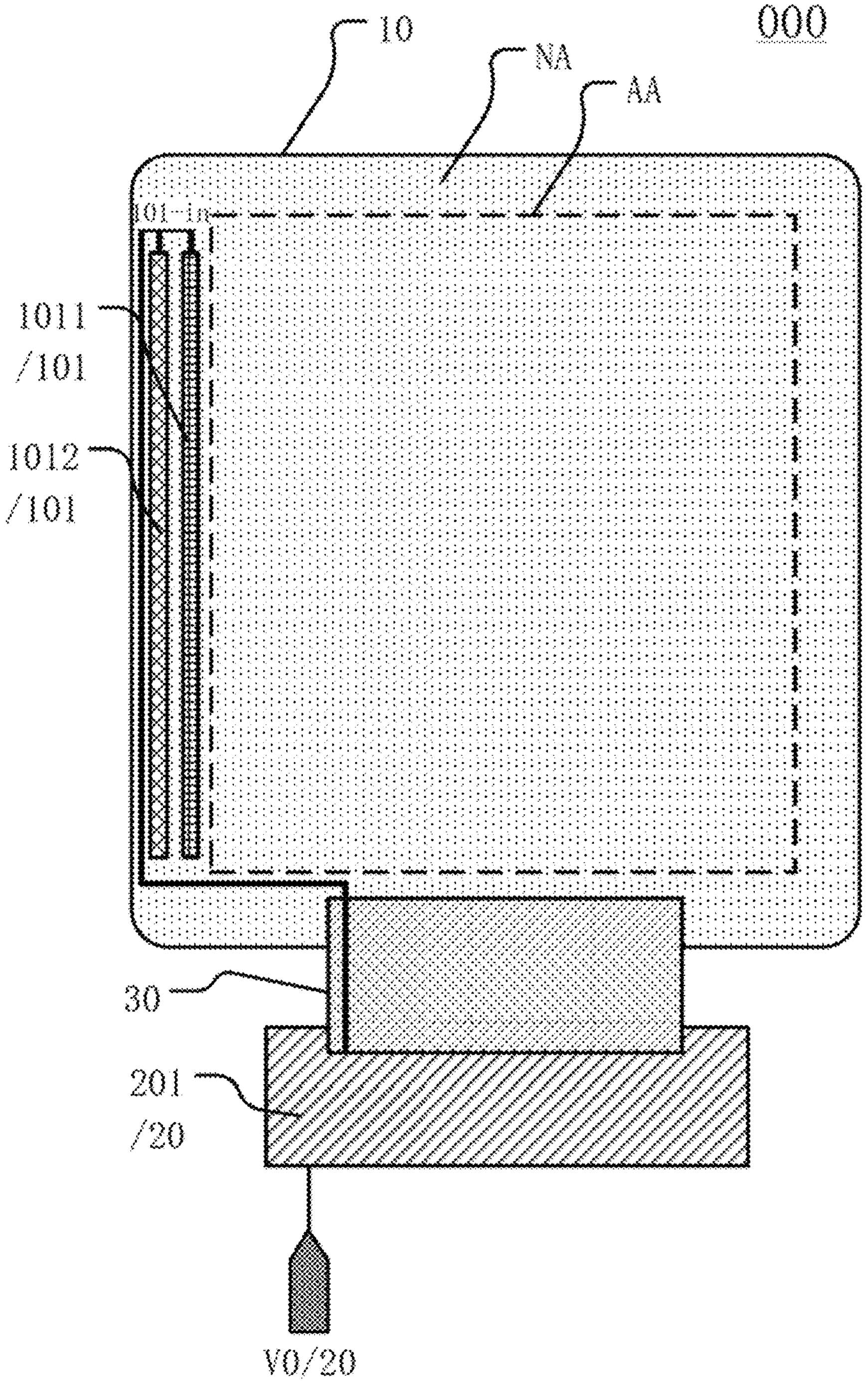
FIG. 13 illustrates a planar structure of another exemplary display device consistent with various disclosed embodiments in the present disclosure.

In one embodiment shown in FIG. 2 and FIG. 13 which is another planar structure of the display device, the display driving circuit 101 provided in the non-display region NA of the display panel 10 may include a scan driving circuit 1011 and/or a light emitting control circuit 1012. The scan driving circuit 1011 may include a plurality of scan driving units connected in cascade, to provide the scan driving signals to the scanning signal lines in the display region AA of the display panel 10. The light-emitting control circuit may include a plurality of light-emitting driving units connected in cascade, to provide light-emitting driving signals to the light-emitting signal lines in the display region AA of the display panel 10 (not shown in the figure). The scanning signal lines and the light-emitting signal lines may be electrically connected to the pixel circuits provided in the pixel units of the display region AA, thereby realizing the control of the pixel units by the display driving circuit 101 and ensuring the light-emitting display effect of the display panel 10.

Optionally, as shown in FIG. 2 and FIG. 13, the display driving circuit 101 may include a power input terminal 101-*in*, and the first power supply V1 output by the output terminal 201-*out* of the display driving component 201 and generated by the display driving component 201, may be electrically connected to the power input terminal 101-*in*, to provide a driving power supply voltage for the display driving circuit 101 to realize the driving operation of the pixel units in the display region AA of the display panel 10 by the display driving circuit 101.

It should be noted that this embodiment does not limit the layout of the pixel circuits, scanning signal lines, and light-emitting signal lines in the display region AA of the display panel 10, and the specific electrical connection structures of the scanning driving circuit 1011 and the light-emitting control circuit 1012 in the non-display region NA. For specific understanding, the reference may be made to the electrical connection structure of the display driving circuit of the organic light-emitting diode display panel in the existing technology.

Figure 14:
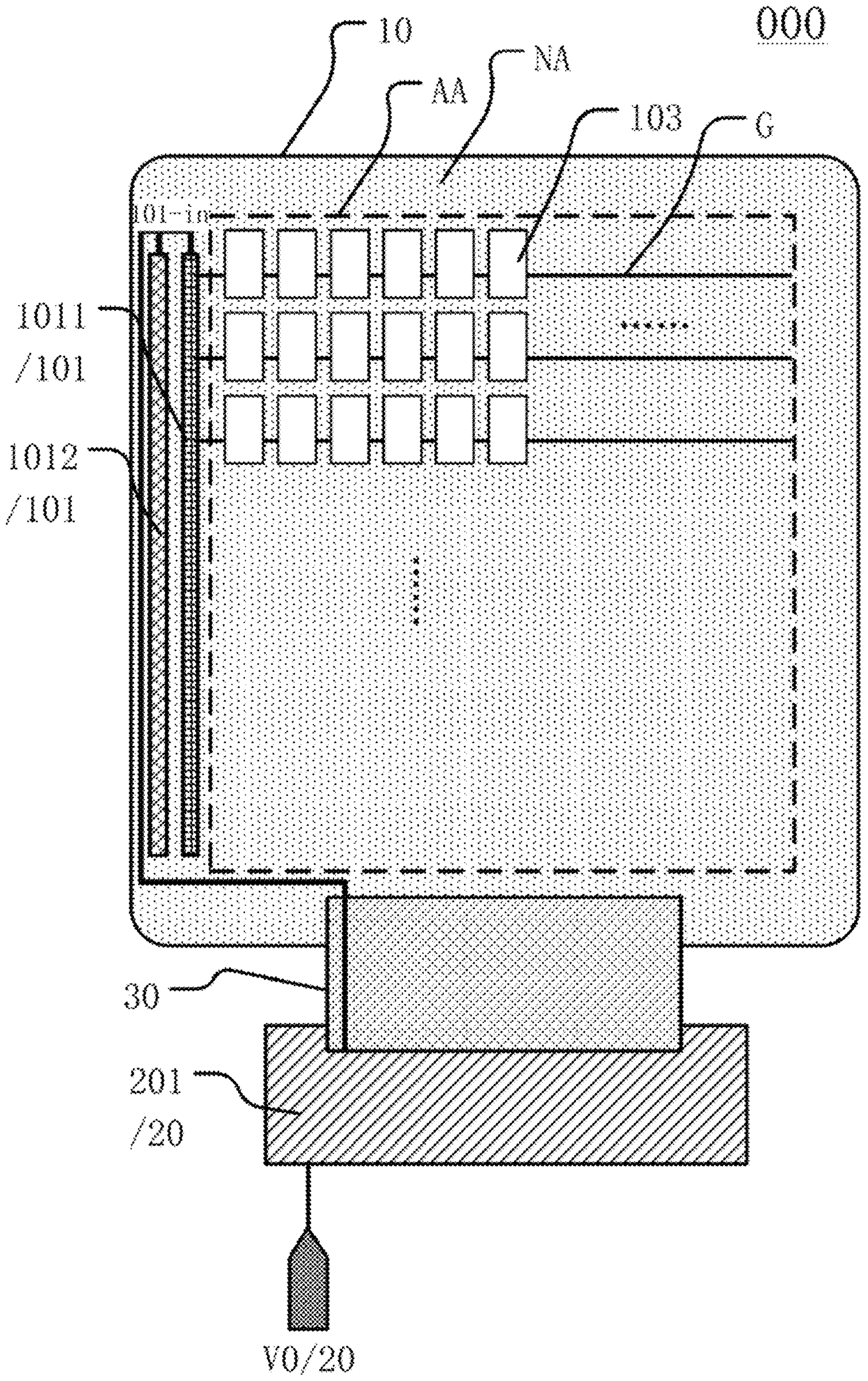
FIG. 14 illustrates a planar structure of another exemplary display device consistent with various disclosed embodiments in the present disclosure.
Figure 15:
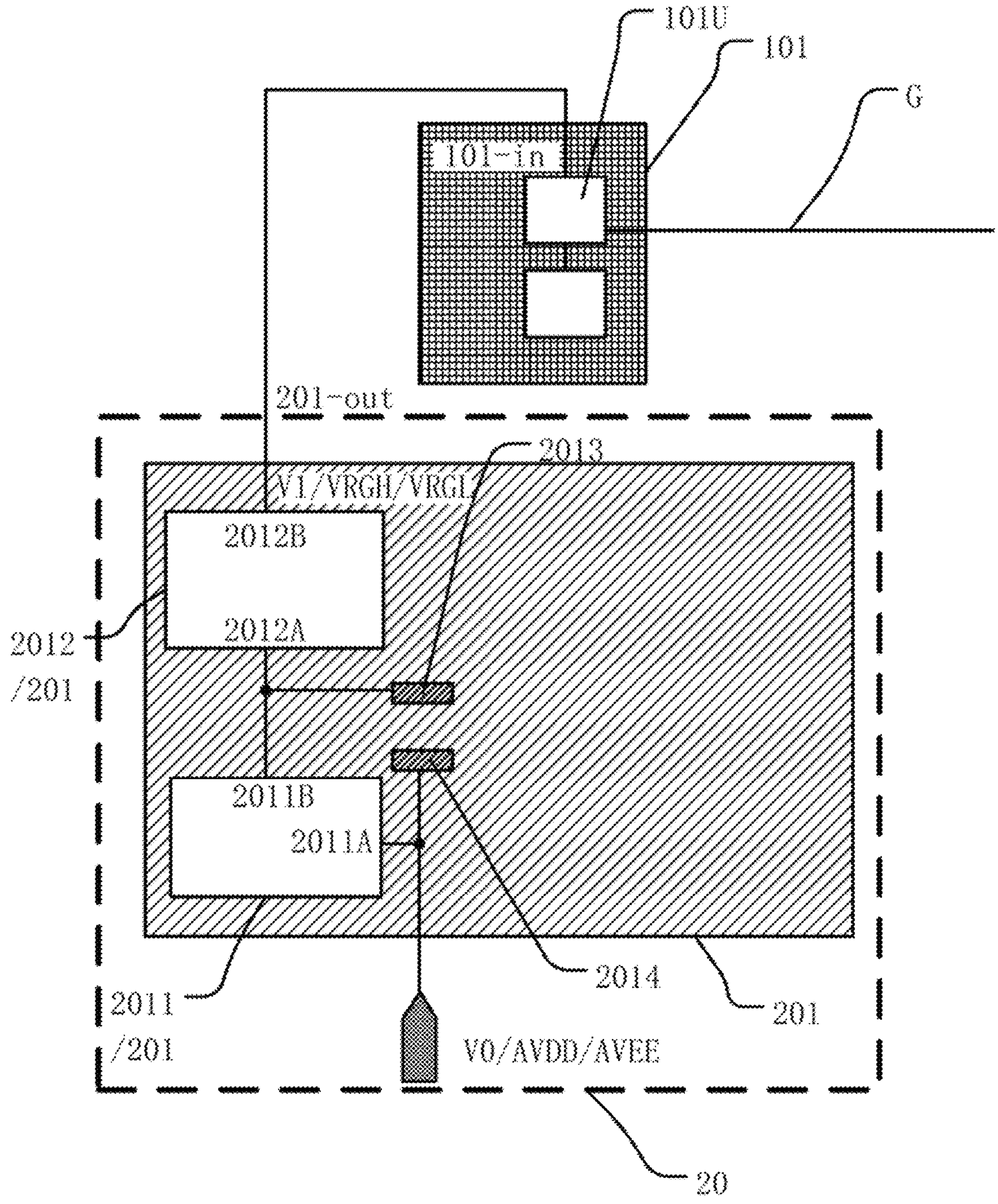
FIG. 15 illustrates an electrical connection structure of scan lines, a display driving circuit, and a display driving component shown in FIG. 14, consistent with various disclosed embodiments in the present disclosure.

In one embodiment shown in FIG. 2, FIG. 14 which is another planar structure of the display device and FIG. 15 which is an electrical connection structure of the scanning lines, the display driving circuit, and the display driving component, the display region AA of the display panel 10 may include a plurality of pixel circuits 103 and a plurality of scanning lines G. The plurality of pixel circuits 103 may be electrically connected to the plurality of scanning lines G.

The display driving circuit 101 may include output modules 101U. Each output module 101U may include a power input terminal 101-*in*. The first power supply V1 may be electrically connected to the power input terminal 101-*in*, and the output terminal of the output module 101U may be electrically connected to the plurality of scanning lines G.

In the present embodiment, the display region AA of the display panel 10 may include the plurality of pixel circuits 103 and the plurality of scanning lines G. Optionally, one scanning line G of the plurality of scanning lines G may be electrically connected to multiple pixel circuits 103 in the same row, to use the scan driving signal transmitted by the scanning line G to control the driving operation of one corresponding pixel circuit 103. In various embodiments, the electrical connection structure between the plurality of scanning lines G and the plurality of pixel circuits 103 may have other suitable forms, and the present embodiment is only an example and does not specifically limit the scope of the present disclosure. The display driving circuit 101 of the non-display region NA may include the output modules 101U. Optionally, the display driving circuit 101 may include a plurality of driving units connected in cascade. Each driving unit may include one output module 101U, and the output module 101U may include the power input terminal 101-*in*, to transmit the first power V1 generated by the display driving component 201 to the output module 101U of the display driving circuit 101 through the power input terminal 101-*in* included in the output module 101U and provide the driving power supply voltage for the output module 101U of the display driving circuit 101. The display driving circuit 101 may also include other circuit modules that cooperate with the output modules 101U to generate the scanning driving signal, and then the scanning driving signals may be finally transmitted to the plurality of scanning lines G through the output terminals of the output modules 101U, to control the driving operation of the plurality of pixel circuits 103.

In the drawings, the display driving circuit 101 and the output modules 101U are represented by blocks. For the details of the output modules, the reference may be made to the structures of the scanning driving circuit or the light-emitting control circuit in the existing technology. The present embodiment is only used as an example to illustrate the transmission of the first power supply V1 generated by the display driving component 201 to the output modules 101U of the display driving circuit 101 through the power input terminals 101-*in* in the output modules 101, to achieve the operation of the display driving circuit 101.

Figure 16:
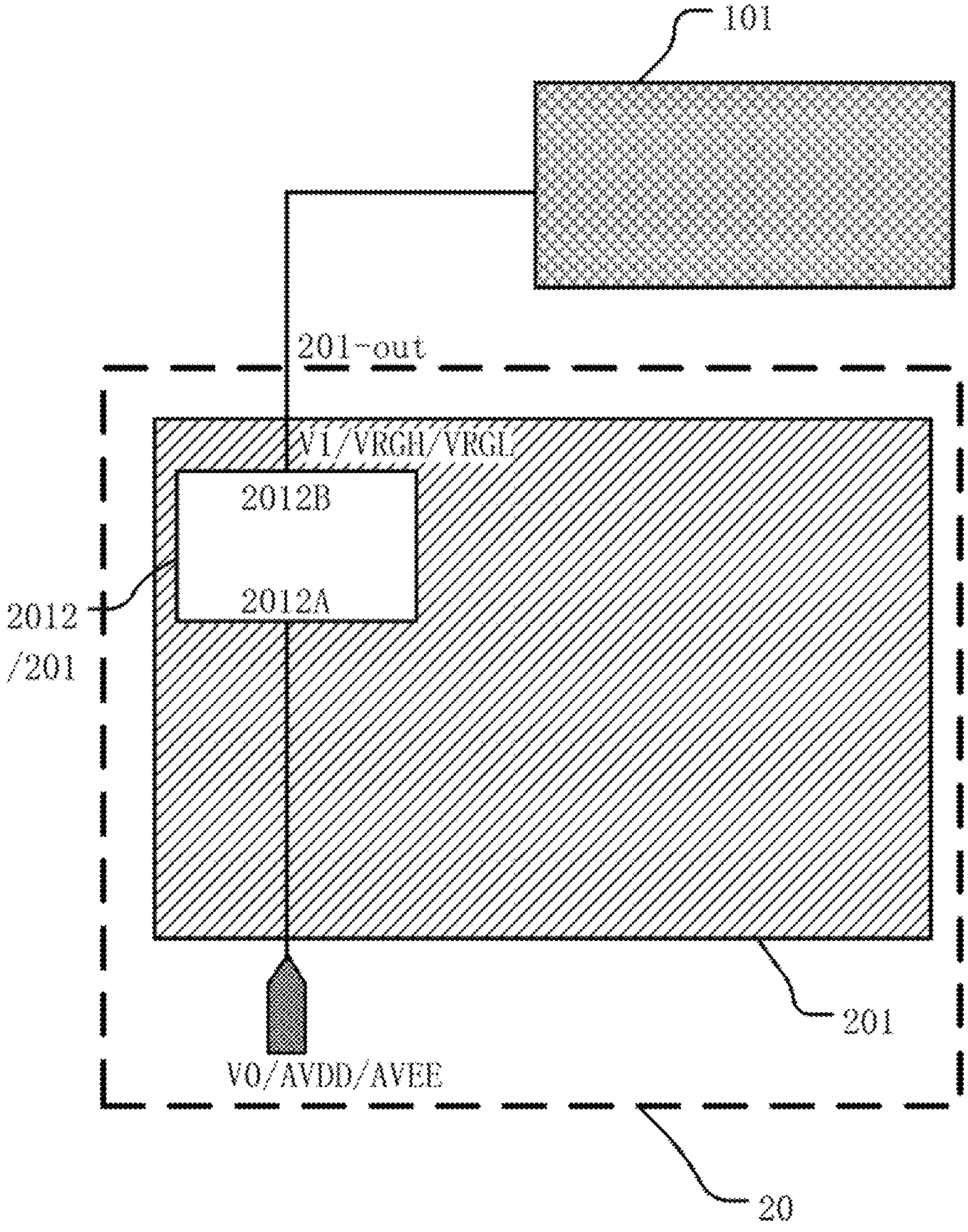
FIG. 16 illustrates an electrical connection structure of a power supply circuit and a display driving circuit in the display device shown in FIG. 1, consistent with various disclosed embodiments in the present disclosure.

In another embodiment shown in FIG. 1 and FIG. 16 which is another electrical connection of the power supply circuit and the display driving circuit in FIG. 1, the display device 000 may include a display panel 10, and a power supply circuit electrically connected to the display panel 10. A display driving circuit 101 may be disposed in a non-display region NA of the display panel 10.

The power supply circuit 20 may include a display driving component 201 and a power supply V0 electrically connected to each other.

The display driving component 201 may include a first voltage stabilizing circuit 2012, and the power supply V0 may be electrically connected to the input terminal 2012A of the first voltage stabilizing circuit 2012. The output terminal 2012B of the first voltage stabilizing circuit 2012 may be electrically connected to the output terminal 201-*out* of the display driving component 201, and the output terminal 201-*out* of the display driving component 201 may be electrically connected to the display driving circuit 101.

The output terminal 2012B of the first voltage stabilizing circuit 2012 may generate the first Power supply V1. The value of the first power supply V1 may be greater than the value of the power supply V0.

In the present embodiment, the display device 000 may include the display panel 10 and the power supply circuit 20 that supplies power to the display panel 10. The power supply circuit 20 may be electrically connected to the display panel 10. It can be understood that the display panel 10 may be an organic light-emitting diode display panel or other types of display panels, which is not limited in this embodiment. The structure of the display panel 10 is not described in detail in this embodiment. During specific implementation, the reference may be made to the structure of the display panel in the existing technology, for understanding according to the type of the display panel 10. Optionally, the display panel 10 may include a display region AA and a non-display region NA. The display region AA may be generally provided with structures such as pixel units (not shown in the figure) for displaying images. The non-display region NA may be generally provided with the display driving circuit 101 and structures such as signal lines (not shown in the figure) electrically connected to the display driving circuit 101 to provide display driving signals for the pixel units in the display region AA.

In the present embodiment, the power supply circuit 20 may include the display driving component 201 and the power supply V0. The power supply V0 may provide an initial voltage value to the display driving component 201, such that the display driving component 201 of the power supply circuit 20 is able to perform power generation according to the power supply V0. The display driving component 201 may be a display driver integration chip (DDIC). The display driving component 201 may include the first voltage stabilizing circuit 2012. Optionally, the first voltage stabilizing circuit 2012 may be integrated into the display driving component 201. When the display driving component 201 is a display driving chip, the first voltage stabilizing circuit 2012 may be a circuit structure printed and integrated into the display driving chip. This embodiment does not limit the specific structure of the display driving component 201, as long as the display driving component 201 includes the first voltage stabilizing circuit 2012. It can be understood that the figures in this embodiment all use block diagrams to represent the display driving component 201 and the first voltage stabilizing circuit 2012 included therein. During specific implementation, the schematic representation may be based on the actual structure. Optionally, the display driving component 201 of this embodiment may be electrically connected to the display panel 10 through the flexible circuit board structure 30. The electrical connection between the display driving component 201 and the display panel 10 may be integrated with the display panel 10 into one device. For example, the display driving component 201 may be fixed on the backlight surface of the display panel 10 (not shown in the figure, the backlight surface of the display panel 10 may be understood as a side of the display panel 10 opposite to a surface where the display region AA of the display panel 10 is located for display images).

In the present embodiment, the power supply V0 may be electrically connected to the input terminal 2012A of the first voltage stabilizing circuit 2012, and the output terminal 2012B of the first voltage stabilizing circuit 2012 may be electrically connected to the output terminal 201-*out* of the display driving component 201. Optionally, the display driving component 201 may generate the first power supply V1 at the output terminal 2012B of the first voltage stabilizing circuit 2012, that is, the output terminal 201-*out* of the display driving component 201, based on the initial power value provided by the power supply V0 after the voltage is stabilized by the first voltage stabilizing circuit 2012. The output terminal 201-*out* of the display driving component 201 may be electrically connected to the display driving circuit 101. The first power supply V1 may be transmitted to the display driving circuit 101 in the non-display region NA of the display panel 10 to be used as the power supply of the display driving circuit 101, enabling the display driving circuit 101 to operate normally.

The drawings where the display driving circuit 101 is represented by blocks are used to illustrate the present disclosure, and the blocks do not represent actual structures and positions of the display driving circuit 101. In various embodiments, the references may be made to structures of the display driving circuit in existing technologies. Also, the position of the display driving circuit 101 in FIG. 1 is used as an example only to illustrate the present disclosure. In other embodiments, the display driving circuit 101 may be disposed at other positions in the non-display region NA of the display panel 10.

In the existing, the driving power supply voltage required by the display driving circuit provided in the non-display region of the display panel is usually generated in the following processes in sequence. The power supply of the power supply circuit is converted into a higher power supply voltage through a power charging circuit such as a charge bump circuit provided inside the display driving component, and is then passed through the voltage stabilizing circuit to generate a more stable driving power supply voltage. Therefore, the driving power supply voltage required for the display driving circuit on the display panel needs to be converted through a power charging circuit such as a charge bump circuit during the generation process by the display driving component. In this process, additional power consumption will be generated. Also, the charge bump circuit generally is a design circuit that is originally integrated inside the display driving component. Currently, in the process of generating the driving power supply voltage required by the display driving circuit, conversion and generation through the power charging circuit such as the charge bump circuit are unavoidable, which in turn leads to high power consumption of the display driver chip in the existing technology. Therefore, the power consumption of the display driving component electrically connected to the display panel is high.

In the present embodiment, the power supply V0 may be directly electrically connected to the input terminal 2012A of the first voltage stabilizing circuit 2012. The driving power supply voltage required by the display driving circuit 101 in the non-display region NA of the display panel 10, that is, the first power supply V1, may be generated through the following process. The power supply V0 of the power supply circuit 20 may be directly transmitted to the input terminal 2012A of the first voltage stabilizing circuit 2012, and the relatively stable first power supply V1 may be directly generated through the first voltage stabilizing circuit 2012. The value of the first power supply V1 may be greater than the value of the power supply V0, which may meet the design requirements of the display panel 10. After the first power supply V1 is finally output from the output terminal 2012B of the first voltage stabilizing circuit 2012, that is, the output terminal 201-*out* of the display driving component 201, the first power supply V1 may become the required driving power supply voltage of the display driving circuit 101 in the non-display region NA of the display panel 10. Since there may be no need to install a power charging circuit such as a charge bump circuit inside the display driving component, the driving power supply voltage required by the display driving circuit 101 in the non-display region NA of the display panel 10, that is, the first power supply V1, may not need to be converted and generated by the power charging circuit inside the display driving component, and the display driving component 201 may not need to consume additional power. Therefore, the structure of the display driving component 201 may be simplified, and the power consumption (power loss) of the display driving component 201 may be greatly reduced.

In one embodiment, the first power bus may be disposed in the non-display region NA of the display panel 10. The output terminal 201-*out* of the display driving component 201 may be electrically connected to the display driving circuit 101 through the first power bus. The first power bus may be arranged around the frame of the display panel 10. When the display driving component 201 is electrically connected to the display panel 10 through the flexible circuit board structure 30, the first power supply V1 on the output terminal 201-*out* of the display driving component 201 may be transmitted to the first power bus through the flexible circuit board structure 30, and the may be further transmitted to the display driving circuit 101 through the first power bus, to provide the driving power supply voltage for the display driving circuit 101 to operate and realize the electrical connection between the display driving circuit 101 and the first power supply V1. For the structure of the first power bus, the reference may be made to the description of the embodiment shown in FIG. 11.

In one embodiment shown in FIG. 1 and FIG. 16, the power supply V0 of the power supply circuit 20 may include the positive power supply AVDD, or the power supply V0 of the power supply circuit 20 may include the negative power supply AVEE, to provide the positive power voltage VRGH or the negative power voltage VRGL to the display driving circuit.

Figure 17:
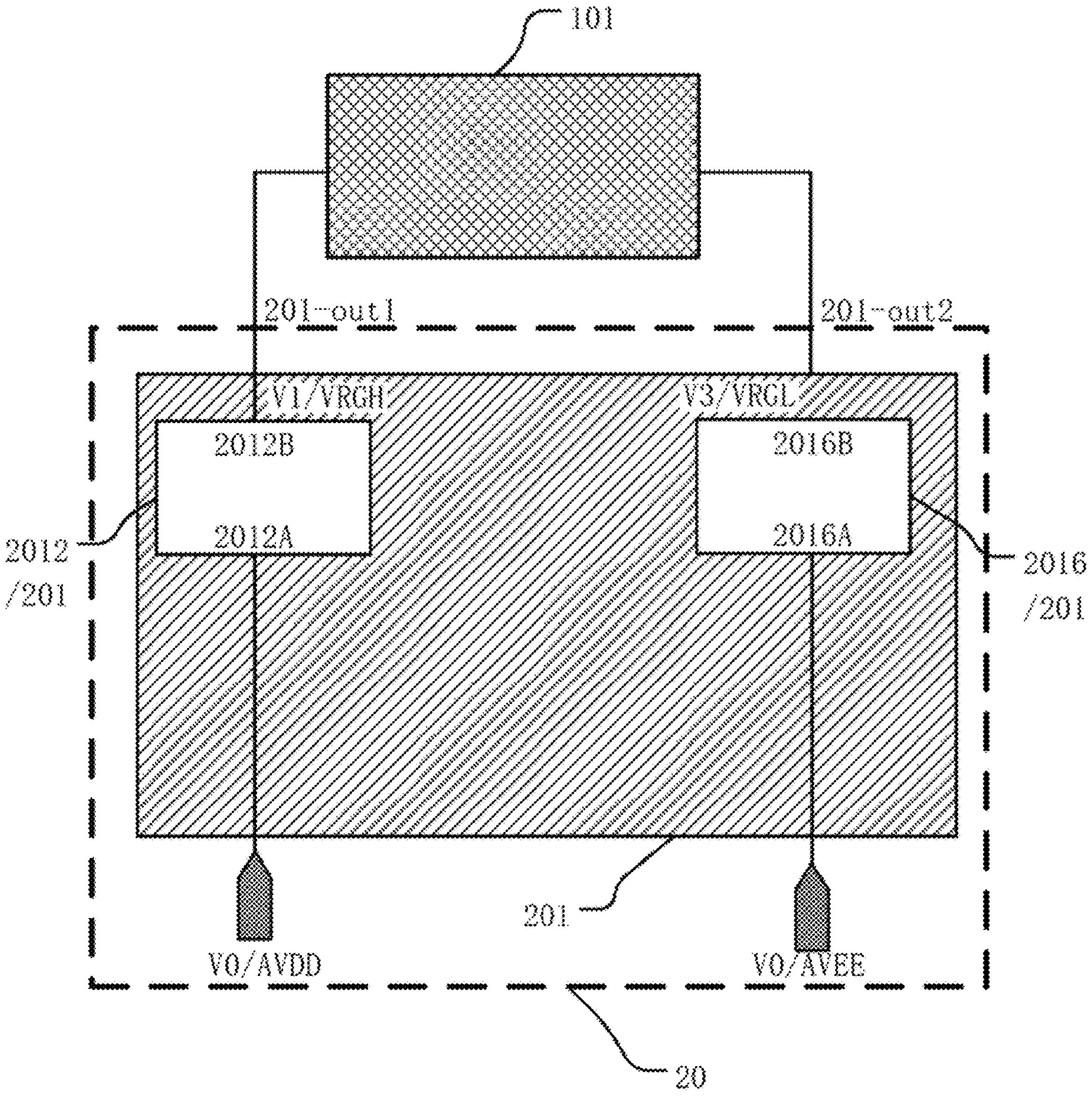
FIG. 17 illustrates an electrical connection structure of a power supply circuit and a display driving circuit in the display device shown in FIG. 5, consistent with various disclosed embodiments in the present disclosure.

In another embodiment shown in FIG. 5 and FIG. 17 which is an electrical connection of the power supply circuit and the display driving circuit in FIG. 5, the power supply V0 of the power supply circuit 20 may include the positive power supply AVDD and the negative power supply A VEE, to provide the positive power voltage VRGH and the negative power voltage VRGL to the display driving circuit. For the connection structure of the positive power supply AVDD and the negative power supply AVEE in the power supply circuit 20, the reference may be made to FIG. 17, and the present embodiment may have the benefits of the positive power supply AVDD and/or the negative power supply AVEE. The reference may be made to the description of the embodiment shown in FIG. 5 and FIG. 6.

Figure 18:
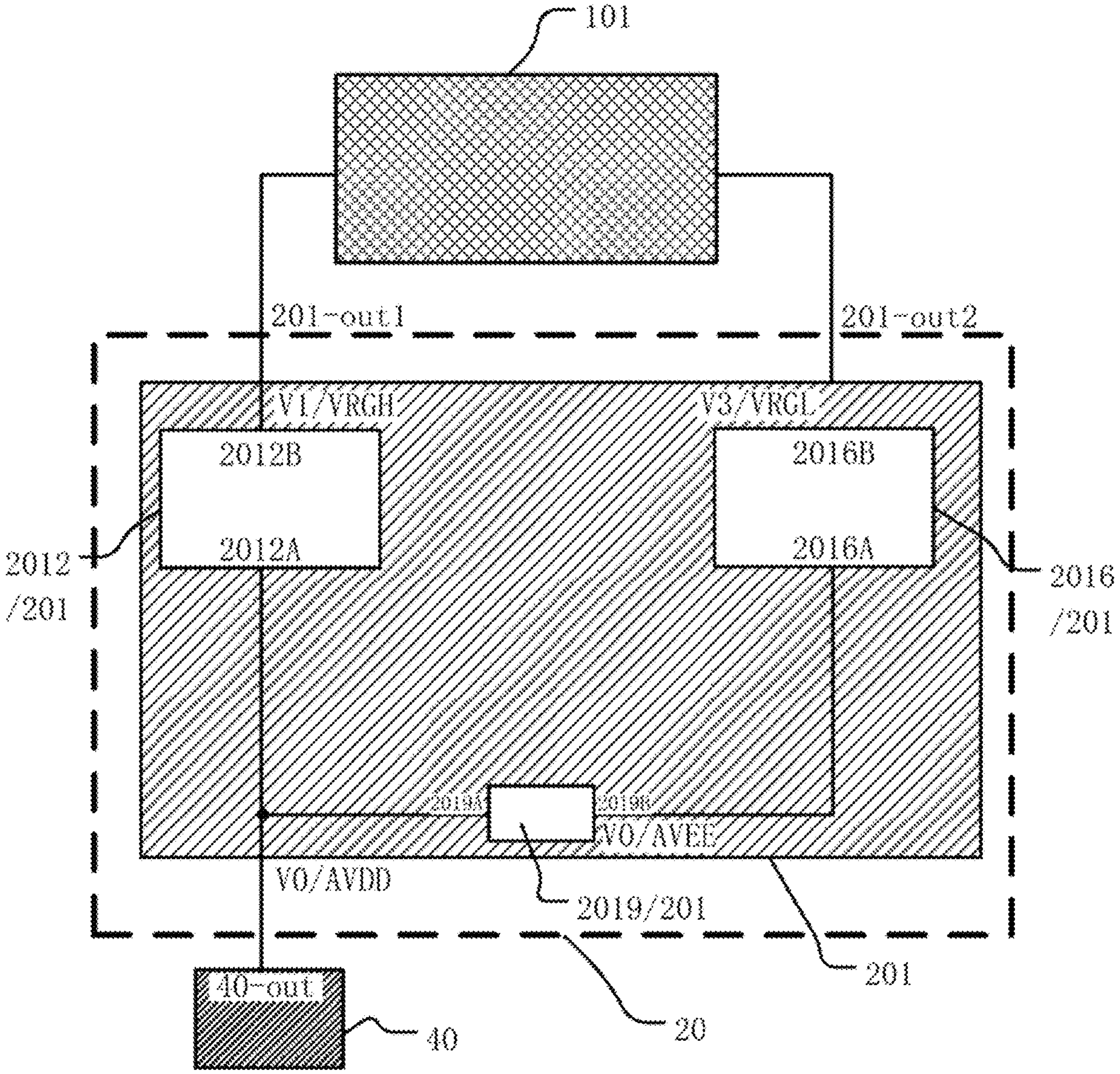
FIG. 18 illustrates an electrical connection structure of a power supply circuit and a display driving circuit in the display device shown in FIG. 9, consistent with various disclosed embodiments in the present disclosure.

In another embodiment shown in FIG. 9 and FIG. 18 which is an electrical connection of the power supply circuit and the display driving circuit in FIG. 9, the power supply V0 of the power supply circuit 20 may include the positive power supply AVDD. The positive power supply AVDD may be electrically connected to the output terminal 40-*out* of the external power supply device 40. Further optionally, the display driving component 201 may further include a conversion circuit 2019. The output terminal 40-*out* of the external power supply device 40 may be electrically connected to the input terminal 2019A of the conversion circuit 2019. The output terminal 2019B of the conversion circuit 2019 may generate the negative power supply AVEE. In the present embodiment, based on the embodiment of FIG. 16, the power supply V0 may include the positive power supply AVDD, and the negative power supply AVEE may be converted by the conversion circuit 2019 inside the display driving component 201. The connection structure may be referred to FIG. 18. However, based on the embodiment of FIG. 16, the beneficial effects generated by the conversion of the power supply V0 by the positive power supply AVDD and the negative power supply AVEE by the conversion circuit 2019 inside the display driving component 201 will not be described in detail here. For details, the reference may be made to the embodiment shown in FIG. 9 and FIG. 10.

In one embodiment shown in FIG. 13 and FIG. 16, the display driving circuit 101 provided in the non-display region NA of the display panel 10 may include a scan driving circuit 1011 and/or a light emitting control circuit 1012. The scan driving circuit 1011 may include a plurality of scan driving units connected in cascade, to provide the scan driving signals to the scanning signal lines in the display region AA of the display panel 10. The light-emitting control circuit may include a plurality of light-emitting driving units connected in cascade, to provide light-emitting driving signals to the light-emitting signal lines in the display region AA of the display panel 10 (not shown in the figure). The scanning signal lines and the light-emitting signal lines may be electrically connected to the pixel circuits provided in the pixel units of the display region AA, thereby realizing the control of the pixel units by the display driving circuit 101 and ensuring the light-emitting display effect of the display panel 10.

Optionally, as shown in FIG. 13 and FIG. 16, the display driving circuit 101 may include a power input terminal 101-*in*, and the first power supply V1 output by the output terminal 201-*out* of the display driving component 201 and generated by the display driving component 201, may be electrically connected to the power input terminal 101-*in*, to provide a driving power supply voltage for the display driving circuit 101 to realize the driving operation of the pixel units in the display region AA of the display panel 10 by the display driving circuit 101.

It should be noted that this embodiment does not limit the layout of the pixel circuits, scanning signal lines, and light-emitting signal lines in the display region AA of the display panel 10, and the specific electrical connection structures of the scanning driving circuit 1011 and the light-emitting control circuit 1012 in the non-display region NA. For specific understanding, the reference may be made to the electrical connection structure of the display driving circuit of the organic light-emitting diode display panel in the existing technology.

Figure 19:
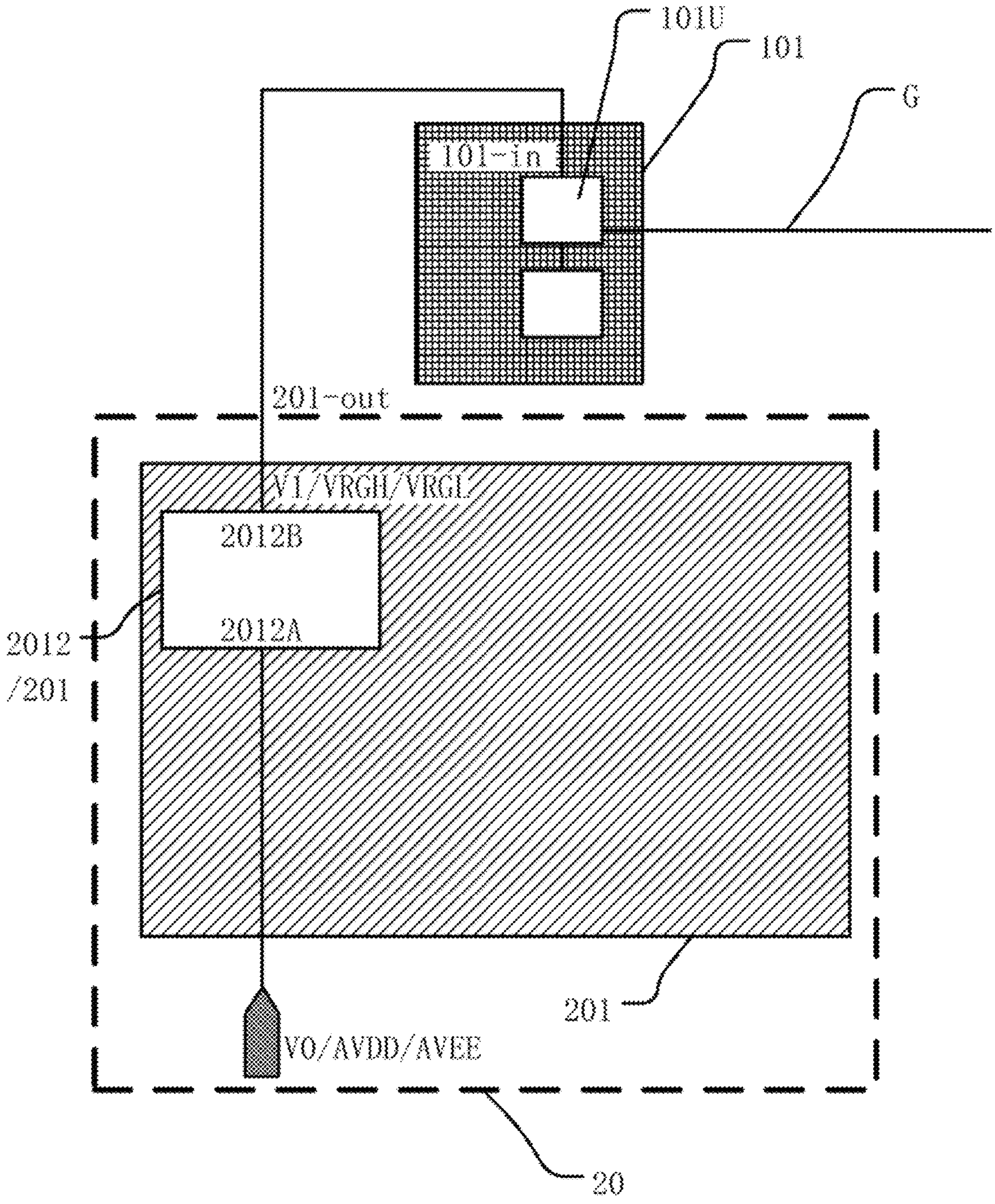
FIG. 19 illustrates another electrical connection structure of scan lines, a display driving circuit, and a display driving component shown in FIG. 14, consistent with various disclosed embodiments in the present disclosure.

In one embodiment shown in FIG. 14, FIG. 16, and FIG. 19 which is an electrical connection structure of the scanning lines, the display driving circuit, and the display driving component, the display region AA of the display panel 10 may include a plurality of pixel circuits 103 and a plurality of scanning lines G. The plurality of pixel circuits 103 may be electrically connected to the plurality of scanning lines G. The display driving circuit 101 may include output modules 101U. Each output module 101U may include a power input terminal 101-*in*. The first power supply V1 may be electrically connected to the power input terminal 101-*in*, and the output terminal of the output module 101U may be electrically connected to the plurality of scanning lines G.

In the present embodiment, the display region AA of the display panel 10 may include the plurality of pixel circuits 103 and the plurality of scanning lines G. Optionally, one scanning line G of the plurality of scanning lines G may be electrically connected to multiple pixel circuits 103 in the same row, to use the scan driving signal transmitted by the scanning line G to control the driving operation of one corresponding pixel circuit 103. In various embodiments, the electrical connection structure between the plurality of scanning lines G and the plurality of pixel circuits 103 may have other suitable forms, and the present embodiment is only an example and does not specifically limit the scope of the present disclosure. The display driving circuit 101 of the non-display region NA may include the output modules 101U. Optionally, the display driving circuit 101 may include a plurality of driving units connected in cascade. Each driving unit may include one output module 101U, and the output module 101U may include the power input terminal 101-*in*, to transmit the first power V1 generated by the display driving component 201 to the output module 101U of the display driving circuit 101 through the power input terminal 101-*in* included in the output module 101U and provide the driving power supply voltage for the output module 101U of the display driving circuit 101. The display driving circuit 101 may also include other circuit modules that cooperate with the output modules 101U to generate the scanning driving signal, and then the scanning driving signals may be finally transmitted to the plurality of scanning lines G through the output terminals of the output modules 101U, to control the driving operation of the plurality of pixel circuits 103.

In the drawings, the display driving circuit 101 and the output modules 101U are represented by blocks. For the details of the output modules, the reference may be made to the structures of the scanning driving circuit or the light-emitting control circuit in the existing technology. The present embodiment is only used as an example to illustrate the transmission of the first power supply V1 generated by the display driving component 201 to the output modules 101U of the display driving circuit 101 through the power input terminals 101-*in* in the output modules 101, to achieve the operation of the display driving circuit 101.

In the display device provided by the present disclosure, the display driving circuit provided in the non-display region of the display panel may be electrically connected to the display driving component. The display driving component may at least include the first power supply circuit and the first voltage stabilizing circuit. When the display driving component generates the power supply voltage required for the display driving circuit, the first preset bonding point electrically connected to the input terminal of the first voltage stabilizing circuit and the second preset bonding point electrically connected to the power supply may be reserved in advance during the production of the display driving component, and the working mode of the power supply circuit may be flexibly selected based on the capability of the external power supply device. When the first preset bonding point and the second preset bonding point are disconnected, for the higher first power supply required by the display driving circuit, the power supply may be converted to a higher power supply voltage value through the first power circuit, and then the relatively stable first power supply may be generated through the first voltage stabilizing circuit. At this time, the capability requirements for the external power supply equipment that provide the power supply may be lower, which is beneficial to saving costs. When the first preset bonding point and the second preset bonding point are electrically connected, the first power supply circuit may not work. And, for the higher first power supply required by the display driving circuit in the non-display region of the display panel, the power supply of the power supply circuit may be directly transmitted to the first voltage stabilizing circuit. The relatively stable first power supply may be directly generated through the first voltage stabilizing circuit, which becomes the driving power supply voltage required by the display driving circuit in the non-display region of the display panel to meet the design requirements for driving the display panel. Since the first power circuit in the display driving component does not need to work in the second working mode, the power consumption of the display driving component may be greatly reduced.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display device, comprising a display panel and a power supply circuit electrically connected to the display panel, wherein:

a display driving circuit is disposed in a non-display region of the display panel;

the power supply circuit includes a display driving component and a power supply electrically connected to the display driving component;

the display driving component at least includes a first power supply circuit and a first voltage stabilizing circuit;

the power supply is electrically connected to an input terminal of the first power supply circuit;

an output terminal of the first power supply circuit is electrically connected to an input terminal of the first voltage stabilizing circuit;

an output terminal of the first voltage stabilizing circuit is electrically connected to an output terminal of the display driving component; and the output terminal of the display driving component is electrically connected with the display driving circuit;

the display driving component includes a first preset bonding point and a second preset bonding point;

the first preset bonding point is electrically connected to the input terminal of the first voltage stabilizing circuit, and the second preset bonding point is electrically connected to the power supply; and the output terminal of the first voltage stabilizing circuit generates a first power supply; wherein a value of the first power supply is greater than a value of the power supply.

2. The display device according to claim 1, wherein:

the power supply circuit has a first working mode and a second working mode;

in the first working mode, the first preset bonding point and the second preset bonding point are disconnected, the output terminal of the first power supply circuit generates a second power supply, and the output terminal of the first voltage stabilizing circuit generates the first power supply; and in the second working mode, the first preset bonding point and the second preset bonding point are electrically connected, the first power supply circuit does not work, and the output terminal of the first voltage stabilizing circuit generates the first power supply, wherein:

a value of the second power supply is greater than the value of the power supply and greater than the value of the first power supply.

3. The display device according to claim 2, wherein:

in the second working mode, a first component is connected between the first preset bonding point and the second preset bonding point.

4. The display device according to claim 3, wherein:

the first component is a zero-ohm resistor.

5. The display device according to claim 2, wherein:

the display driving component includes a driver program; and in the second working mode, the driver program controls the first power supply circuit not to operate.

6. The display device according to claim 1, wherein:

a first power bus is disposed in the non-display region of the display panel, and the output terminal of the display driving component is electrically connected to the display driving circuit through the first power bus.

7. The display device according to claim 1, wherein:

the power supply includes a positive power supply and/or a negative power supply.

8. The display device according to claim 1, wherein:

the power supply includes a positive power supply, and the positive power supply is electrically connected to an output terminal of an external power supply device.

9. The display device according to claim 8, wherein:

the display driving component further includes a conversion circuit, wherein the output terminal of the external power supply device is electrically connected to an input terminal of the conversion circuit, and an output terminal of the conversion circuit generates a negative power supply.

10. The display device according to claim 1, wherein:

the display driving component includes a driving circuit board and a flexible circuit board, wherein the driving circuit board is bonded and electrically connected to the flexible circuit board; and the first preset bonding point and the second preset bonding point are located on the flexible circuit board.

11. The display device according to claim 1, wherein:

the display driving circuit includes a scan driving circuit and/or a light-emitting control circuit.

12. The driving device according to claim 1, wherein:

the display driving circuit includes a power input terminal, and the output terminal of the display driving component is electrically connected to the power input terminal.

13. The driving device according to claim 12, wherein:

a plurality of pixel circuits and a plurality of scan lines are disposed in a display region of the display panel;

the plurality of pixel circuits is electrically connected to the plurality of scan lines;

the display driving circuit includes an output module;

the output module includes a power input terminal; and the first power supply is electrically connected to the power input terminal, and an output terminal of the output module is electrically connected to the plurality of scan lines.

14. A display device, comprising a display panel and a power supply circuit electrically connected to the display panel, wherein:

a display driving circuit is disposed in a non-display region of the display panel;

the power supply circuit includes a display driving component and a power supply electrically connected to the display driving component;

the display driving component includes a first voltage stabilizing circuit;

the power supply is electrically connected to an input terminal of the first voltage stabilizing circuit;

an output terminal of the first voltage stabilizing circuit is electrically connected to an output terminal of the display driving component; and the output terminal of the display driving component is electrically connected with the display driving circuit;

the output terminal of the first voltage stabilizing circuit generates a first power supply; wherein a value of the first power supply is greater than a value of the power supply;

the display driving component includes a first preset bonding point and a second preset bonding point;

the first preset bonding point is electrically connected to the input terminal of the first voltage stabilizing circuit; and the second preset bonding point is electrically connected to the power supply.

15. The driving device according to claim 14, wherein:

a first power bus is disposed in the non-display region of the display panel, and the output terminal of the display driving component is electrically connected to the display driving circuit through the first power bus.

16. The display device according to claim 14, wherein:

the power supply includes a positive power supply and/or a negative power supply.

17. The display device according to claim 14, wherein:

the power supply includes a positive power supply, and the positive power supply is electrically connected to an output terminal of an external power supply device.

18. The display device according to claim 17, wherein:

the display driving component further includes a conversion circuit, wherein the output terminal of the external power supply device is electrically connected to an input terminal of the conversion circuit, and an output terminal of the conversion circuit generates a negative power supply.

19. The display device according to claim 14, wherein:

the display driving circuit includes a scan driving circuit and/or a light-emitting control circuit.

20. The driving device according to claim 19, wherein:

a plurality of pixel circuits and a plurality of scan lines are disposed in a display region of the display panel;

the plurality of pixel circuits is electrically connected to the plurality of scan lines;

the display drive circuit includes an output module;

the output module includes a power input terminal; and the first power supply is electrically connected to the power input terminal, and an output terminal of the output module is electrically connected to the plurality of scan lines.

* * * * *